US007350190B2

(12) United States Patent
Torres et al.

(10) Patent No.: US 7,350,190 B2
(45) Date of Patent: Mar. 25, 2008

(54) COMPUTER IMPLEMENTED MODELING AND ANALYSIS OF AN APPLICATION USER INTERFACE

(75) Inventors: Robert J. Torres, Colleyville, TX (US); Fitzgerald Steele, Jr., Waterloo, IA (US)

(73) Assignee: International Business Machines Corporation, Armonk, NY (US)

( * ) Notice: Subject to any disclaimer, the term of this patent is extended or adjusted under 35 U.S.C. 154(b) by 681 days.

(21) Appl. No.: 10/880,259

(22) Filed: Jun. 29, 2004

(65) Prior Publication Data

US 2005/0289561 A1 Dec. 29, 2005

(51) Int. Cl.
*G06F 9/44* (2006.01)
*G06F 9/00* (2006.01)
*G06F 17/00* (2006.01)
(52) U.S. Cl. .................. 717/105; 717/109; 717/113; 717/125; 715/762; 715/764; 706/11; 706/47
(58) Field of Classification Search ................ 717/102, 717/104, 110
See application file for complete search history.

(56) References Cited

U.S. PATENT DOCUMENTS

| 5,550,971 | A | 8/1996 | Brunner et al. ............ 395/161 |
|---|---|---|---|
| 6,233,570 | B1 | 5/2001 | Horvitz et al. ............... 706/11 |
| 6,260,035 | B1 | 7/2001 | Horvitz et al. ............... 706/60 |
| 6,405,159 | B2 | 6/2002 | Bushey et al. ............... 703/13 |
| 6,778,643 | B1 * | 8/2004 | Bushey et al. ........... 379/88.18 |
| 7,139,369 | B2 * | 11/2006 | Martin et al. ........... 379/88.16 |
| 2001/0011211 | A1 | 8/2001 | Bushey et al. ............... 703/22 |
| 2002/0188717 | A1 * | 12/2002 | Mushlin et al. ............ 709/224 |

* cited by examiner

*Primary Examiner*—Tuan Dam
*Assistant Examiner*—Isaac T Tecklu
(74) *Attorney, Agent, or Firm*—David A. Mims, Jr.; Rudolf O. Siegesmund; Gordon & Rees, LLP

(57) ABSTRACT

A Modeling and Analysis Program (MAP) having a modeler, an estimator, and an evaluator is disclosed. The MAP guides the user through the design process. The modeler takes the user's input of a process diagram and creates a model organized by pages. An estimator is applied to the model to calculate the performance along the pages on each path in the model. The performance is compared to criteria. If the performance is not within a range acceptable to the user, then an evaluator is invoked. The evaluator makes recommendations for modifications to the model to improve performance.

42 Claims, 19 Drawing Sheets

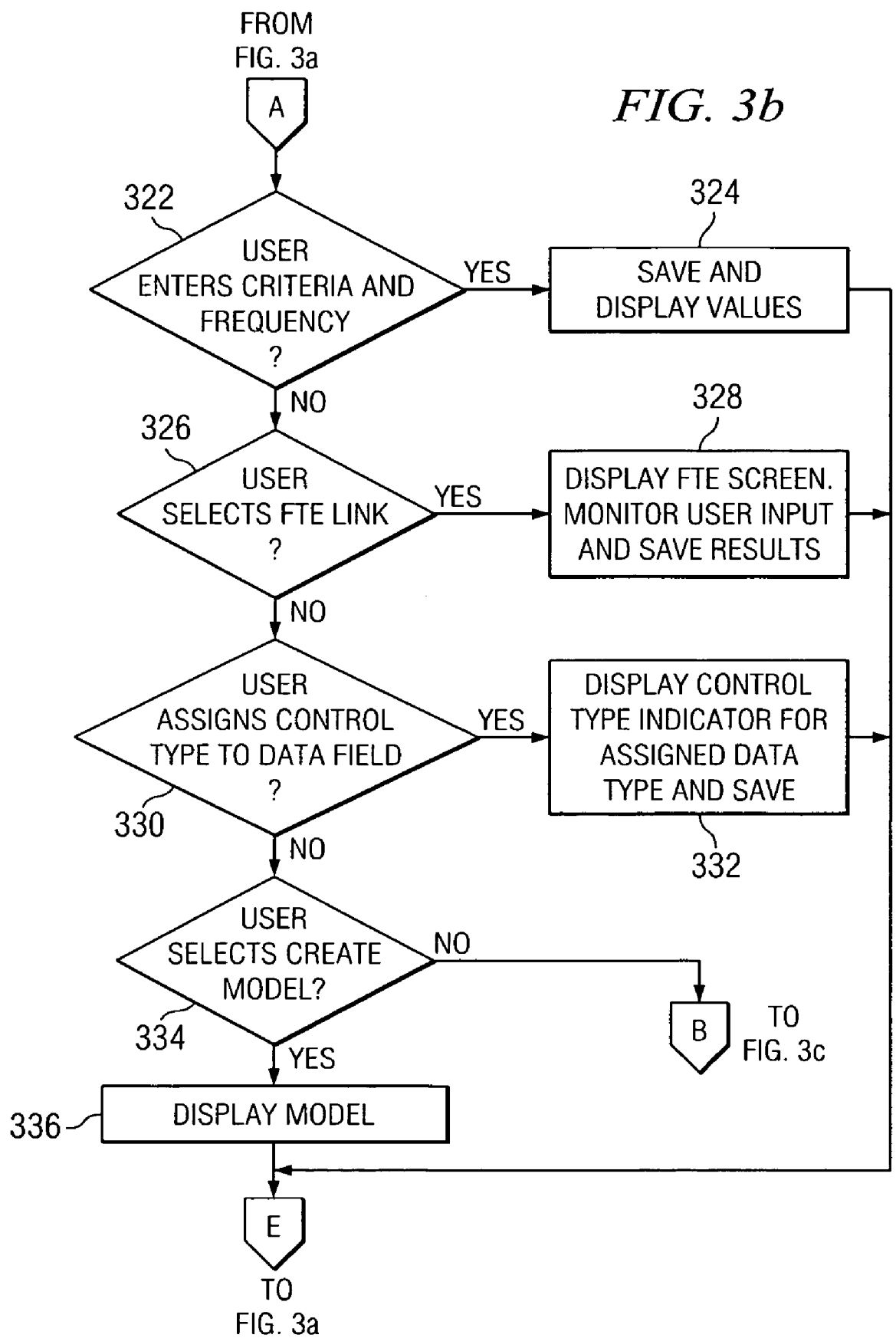

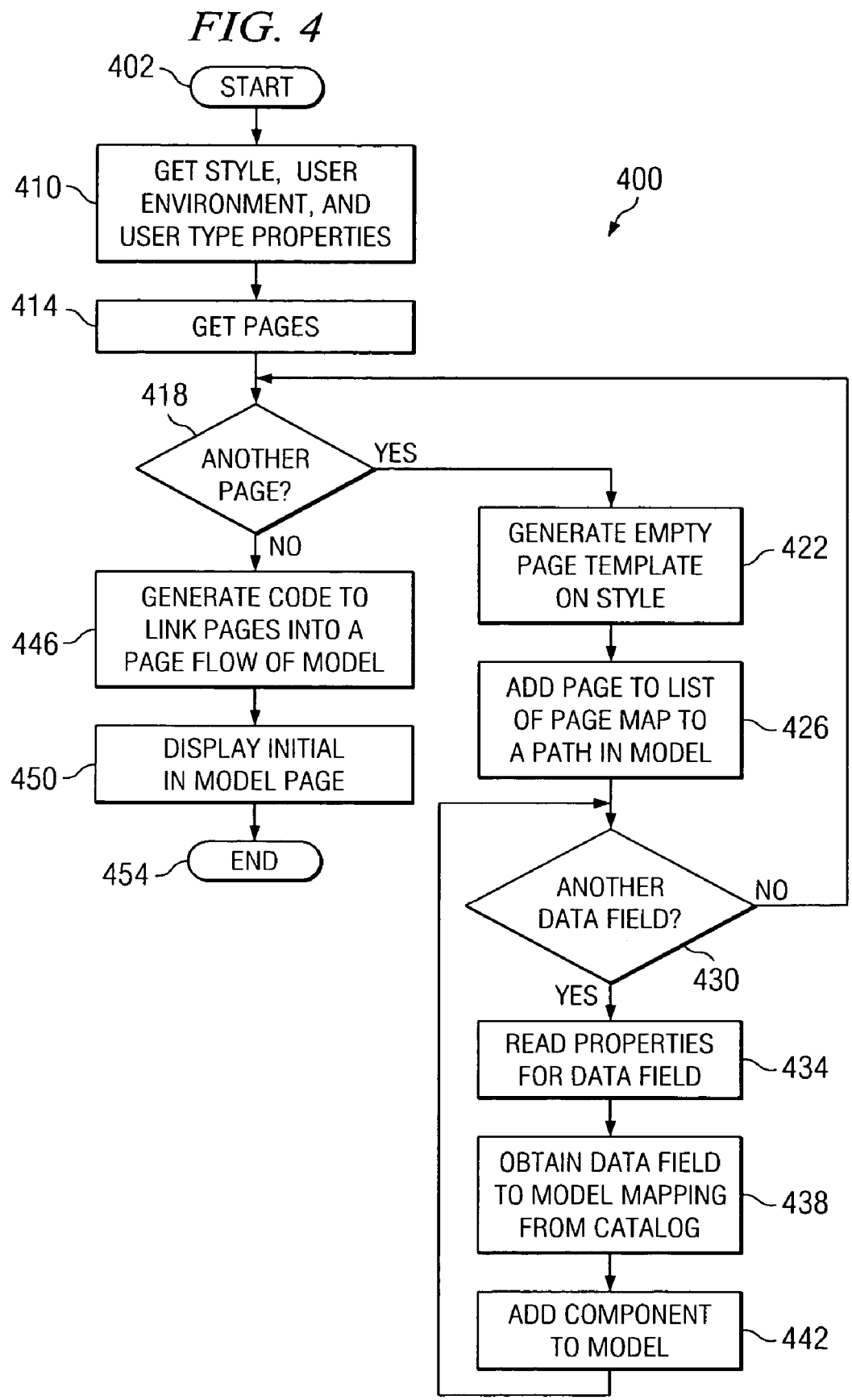

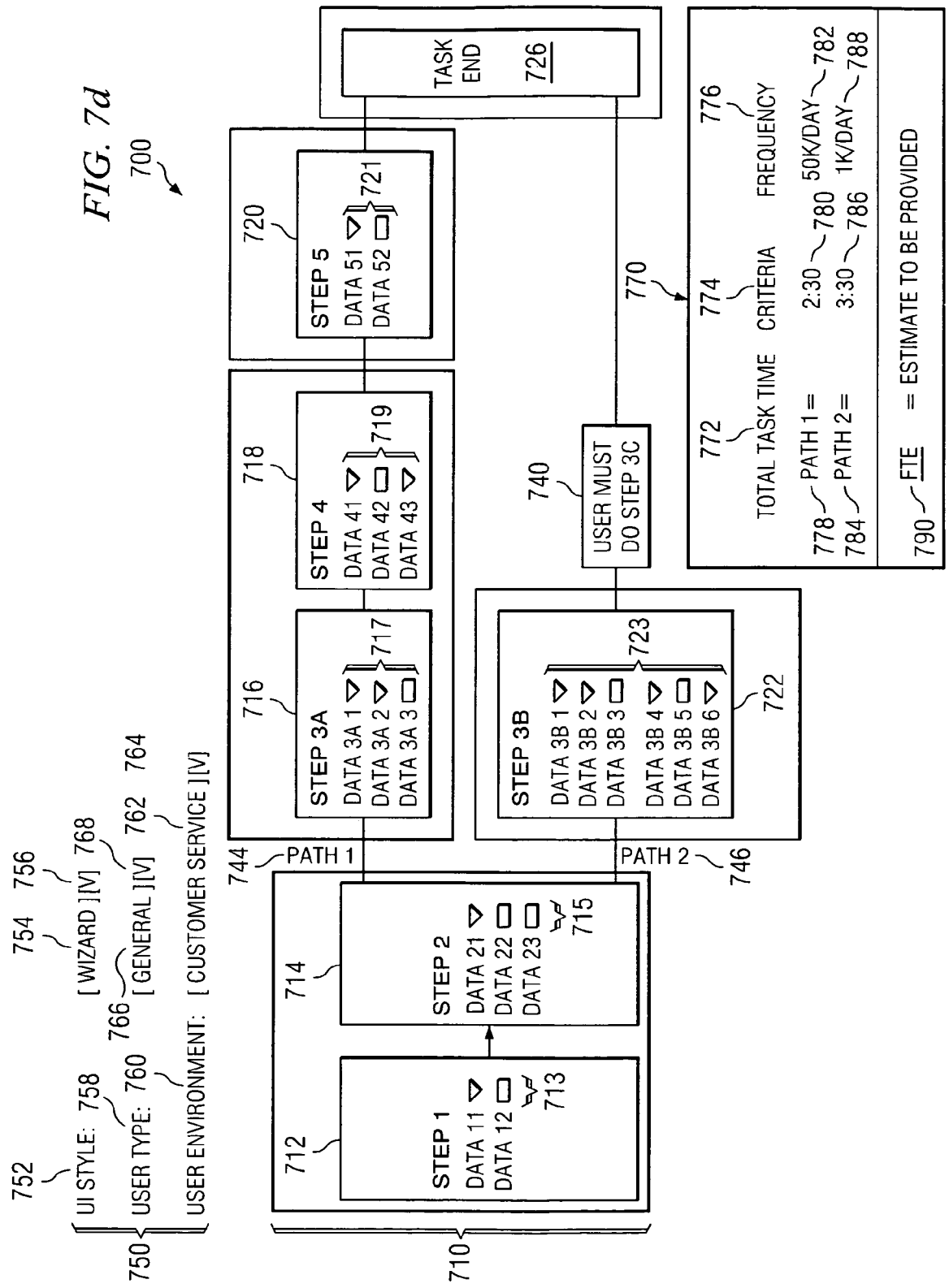

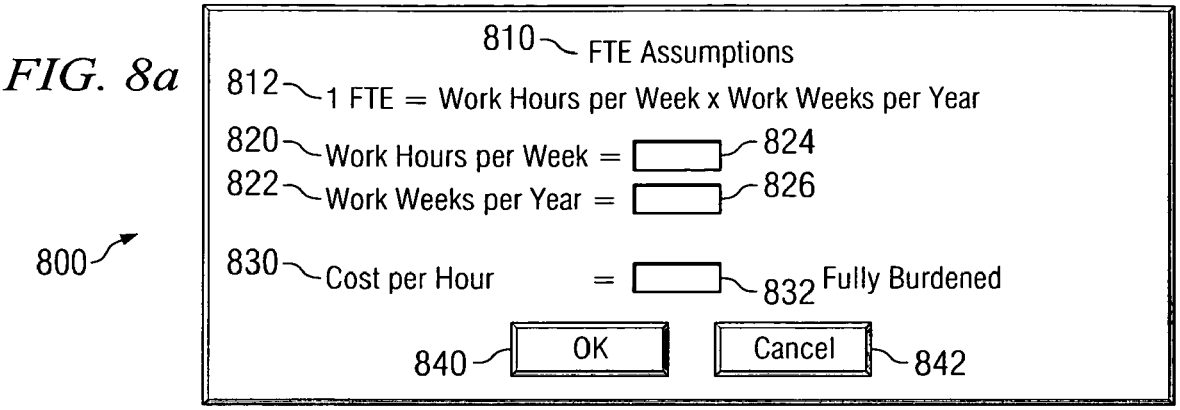

| STYLE: WIZARD USER TYPE: GENERAL USER ENVIRONMENT: CUSTOMER SERVICE ||
|---|---|
| MODEL COMPONENTS | TIME (SEC) |
| • ASK QUESTION | 3.0 |
| • LISTEN TO ANSWER | 3.0 |
| • INPUT ANSWER | 3.0 |
| • SYSTEM RESPONSE | 2.0 |
| • MENTAL PREPARATION | 1.4 |
| • KEYBOARD -> MOUSE | 0.4 |
| • MOUSE -> KEYBOARD | 0.4 |
| • MOUSE MOVEMENT | 1.1 |
| • CLICK MOUSE | 0.2 |
| • TAB KEY | 0.5 |
| • ENTER KEY | 1.0 |

FIG. 8c

| EXAMPLE CUSTOMER SERVICE MODEL ||
|---|---|
| SCREEN IS DISPLAYED ||
| + MENTAL PREPARATION | 1.4 |
| + ASK QUESTION | 3.0 |
| + LISTEN TO ANSWER | 3.0 |
| + INPUT ANSWER | 3.0 |
| + TAB | 0.5 |
| + ASK QUESTION | 3.0 |
| + LISTEN TO ANSWER | 3.0 |
| + KEYBOARD -> MOUSE | 0.4 |
| + POINT | 1.1 |
| + CLICK | 0.2 |
| + MOUSE -> KEYBOARD | 0.4 |
| + ENTER KEY | 1.0 |
| SUB-TOTAL | 20.0 SEC |

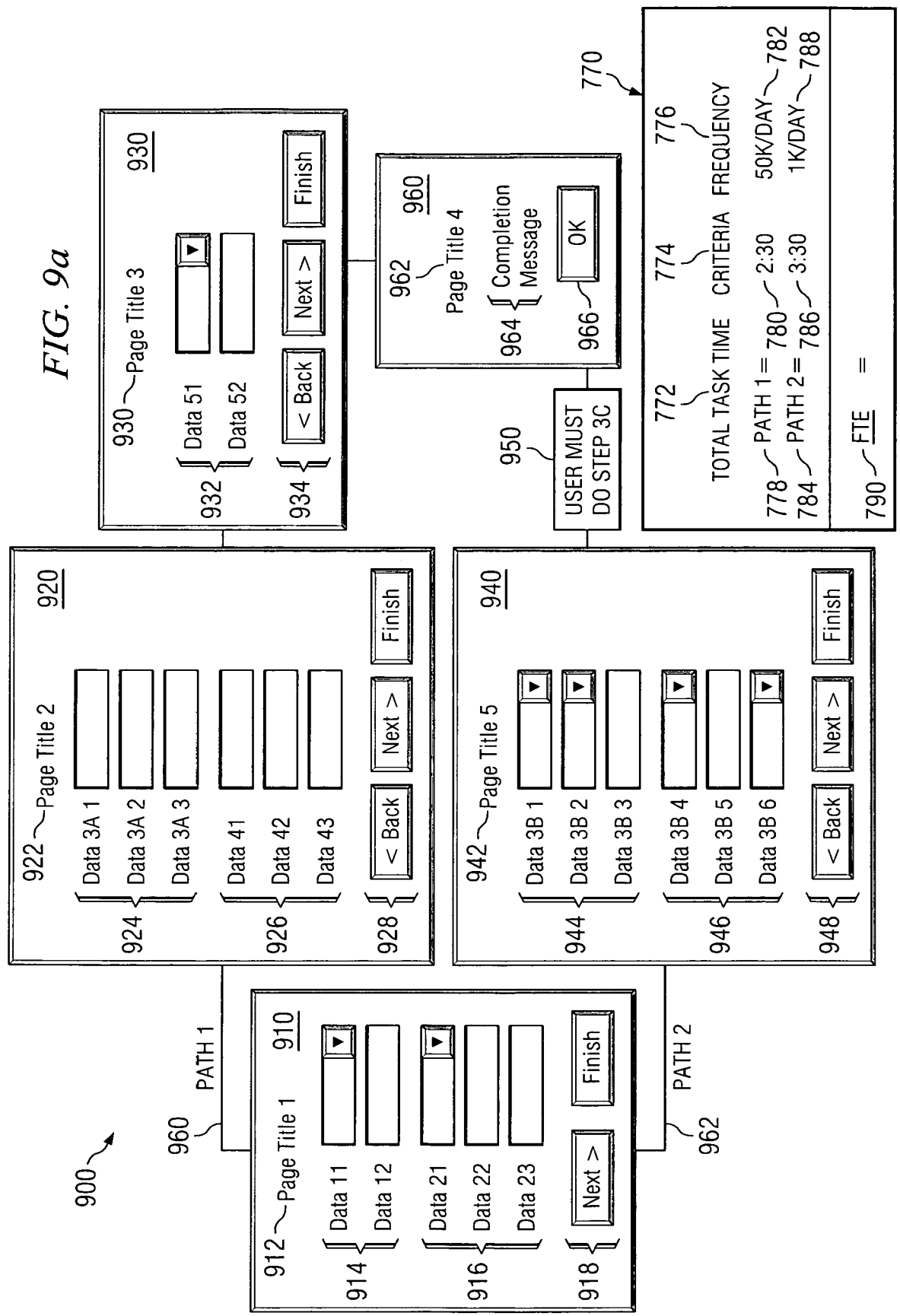

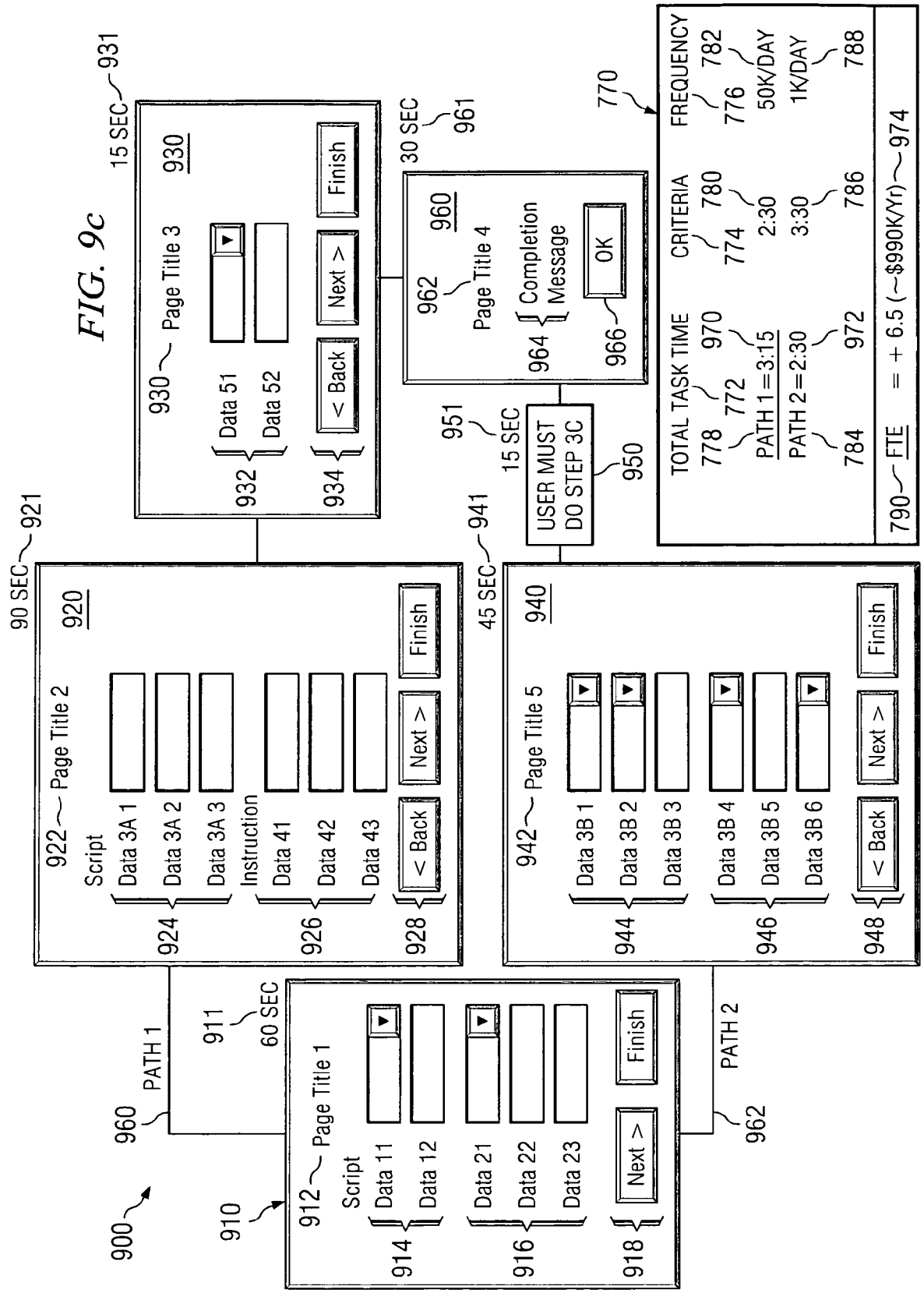

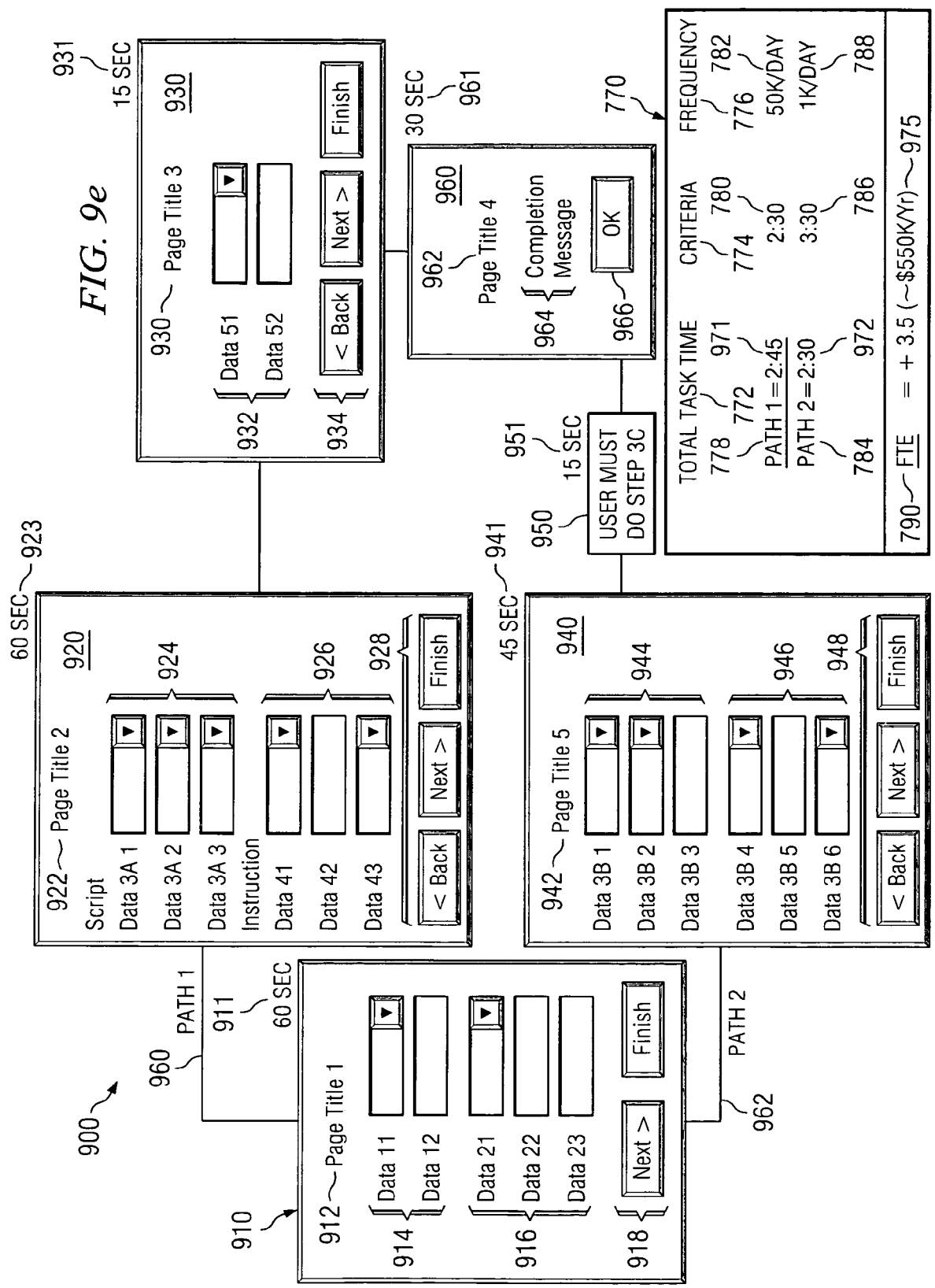

COMPUTER IMPLEMENTED MODELING AND ANALYSIS OF AN APPLICATION USER INTERFACE

FIELD OF THE INVENTION

This invention is related to the field of data processing and specifically to the area of software development through computer implemented modeling and analysis of an application's interface usability.

BACKGROUND OF THE INVENTION

An application developer designs programming systems and other applications for a user's work, such as software that does inventory control or payroll. One aspect of the application developer's design task is to create a user interface. The user interface may be hardware, software, or both that allows a user to interact with and perform operations on a system, program or device. The user interface comprises a series of pages displayed on the user's display screen. The pages contain the instructions, fields, controls, labels and scripts so that the user can interact with the application to complete the task for which the application is designed. The pages may be graphical user interface windows, web pages, or other mechanisms to display information. The design of these pages and the design of the flow of the pages as they appear to the user goes beyond the programming skills of the application developer and into the area of human-machine interaction.

Human machine interaction directly influences usability. Usability is the quality of a system, program, or device that enables it to be easily understood and conveniently employed by a user. Unlike machines, humans cannot be predicted with mathematical precision. However, human testing, observation, best practice analysis, interviews, captured historical data, and other methods may be used to determine how users react to certain heuristic factors in a design and to determine average times associated with these reactions. The heuristic factors may be used to assess positive and negative user reactions. The average times can be summed over a series of tasks to predict the performance of the interaction of a human with a computer implemented process through a user interface.

When interacting with a computer, a user may do operations such as the following: react to the page displayed, read instructions, prepare to respond to the page, input data by using a mouse or keyboard, move the mouse to a target on the page, click the mouse, use the tab key, use the enter key, and wait for a system response. Each of these discrete operations can be measured in order to create a table of predictive times based on averages, assumptions or estimates. Many sources for predictive times can be found in publications in print or on the Internet, and modeling techniques using predictive times are well known. Goals, Operators, Methods and Selection rules (GOMS) is a family of modeling techniques used by developers to model a user's behavior while performing known tasks. One version of GOMS is the Keystroke-Level Model (KLM) that predicts the execution time of a task by adding up the individual times associated with keystroke level actions. Keystroke level means user actions such as pressing keys or moving the mouse as opposed to more complex actions. KLM was proposed by Card, Moran, & Newell in 1983. Predictive times for mental preparation may be found in Rubin's, *The Human Interface*, "GOMS Keystroke-Level Model." Predictive times for movement from a keyboard to a mouse may be found in Preece et al., *Human Computer Interaction*, "Modelling: The Keystroke Level Model." Predictive times for movement from a mouse to a keyboard may be found at: http://www.sju.edu/~jhodgson/gui/goms_keys.html. Predictive times for movement from a mouse to a target may be found at: http://www.csl.mtu.edu/cs3611/www/GuiDesign/metricsspck.html. Articles may be found posted on the Internet such as "Using the Keystroke-Level Model to Estimate Execution Times," by David Kieras, University of Michigan, 1993, and "GOMS," by Lorin Hochstein, University of Maryland, Department of Computer Science, 2002. Therefore, discrete time values for predicting human interaction with an application user interface are known, and the modeling techniques for developing such predictive data are known.

In addition to determining predictive times, heuristic analysis may be employed to evaluate the usability of a user interface. In general, heuristics pertains to exploratory methods of problem solving in which solutions are discovered by evaluation of the progress made toward the final result. A heuristic method employs a sequence of trials yielding approximate results, with control of the progression toward an acceptable final result. Heuristic rules are written to capture the heuristics an expert uses to solve a problem. Heuristic rules can be made based upon human testing, observation, best practice analysis, interviews, captured historical data, and other methods in order to select rules of thumb or guidelines to minimize steps required to perform a task.

In particular, heuristic rules can also be applied to achieve a desired interface style, approach, or usability. For example, Jakob Nielsen has published papers at www.useit.com/papers/heurisitic such as "How to Conduct a Heuristic Evaluation" and Ten Usabililty Heuristics" directed toward "user interface design." Nielsen's recommended evaluation uses three to five evaluators who separately and physically inspect the interface and then communicate to "aggregate" their findings. Nielsen's rules address such factors as visibility, consistency, recognition, and documentation. Thus, heuristic analysis of an interface using manual techniques is known.

While the manual use of predictive time values and the separate manual use of heuristics to improve the usability of an application interface are known, a need exists for a design process using predictive times and heuristics together to improve usability. Moreover, a need exists for such a design process that can be applied to different environments and interface styles.

An environment, in the context of application interface design, means the number of users, customers, machines and databases that singly or in combination may interact in order for the application to perform its purpose. Specific application environments may be defined. Each specific application environment has individualized needs for different users of the application. For example, in a customer service environment, a customer service representative who performs maintenance services for a company's products or services will have a need to quickly receive technically accurate information from the customer regarding problems that may arise with the product, and the quality of the information received may depend on the interface the customer will use to transmit data.

An interface style, in the context of application interface design, means the type of display, the computers, and the networks, singly or in combination, that are used to obtain information from the user and to present information to the user of an application. For example, one interface style is a graphical user interface (GUI), a second interface style is a Wizard, a third interface style is a personal digital assistant (PDA), and a fourth interface style is a web page.

In addition, neither automated estimation nor heuristic improvement of a user interface have been addressed in commercial products. Therefore, there are no known automated solutions to the problem of integrating task performance estimation and heuristic analysis of usability for application interface pages. The manual and separate analytical techniques that are used consume time and resources. When employed in a high-speed project environment, these manual and separate techniques are error prone.

What is needed in the art is an automated tool for modeling and analyzing tasks in user interface designs that can be used early in a product development cycle, and that can continue to be used through deployment. Tools such as Rational, Bobby, or other development tools do not support the analysis needed for optimization of an interface relative to tasks supported by the application.

Prior art interaction with a user interface involves automatically updating user interfaces to reflect changes in a database. For example, U.S. Pat. No. 5,550,971 discloses a method for generating a user interface adaptable to changes occurring in a remote database by using model layers with the same semantic construction. Because the same semantic construction is used for each layer, software generating the user interface automatically reflects changes in a remote database without a need to recode the program generating the user interface. However, the prior art does not address the need for an automated process to use both predictive time values and the heuristic method together in interface design.

What is needed beyond the prior art is a software program for application developers that automatically models, analyzes, and modifies a task-based user interface design for an application so that the design meets acceptable development criteria.

SUMMARY OF THE INVENTION

The invention that meets the needs described above, is a Modeling and Analysis Program (MAP) having a modeler, an estimator, and an evaluator. The MAP guides the user through the design process. The modeler takes the user's input of a process diagram and creates a model of an interface showing paths and pages for a specific style and for a specific environment. An estimator is applied to the model to calculate the performance along the pages on each path in the model. The estimator calculates the performance by determining a predictive time to complete the operations for each page in the model based upon a performance database, and then summing the predictive times for each page in a path. Once measured, the performance is compared to system criteria. If the performance is not within a range acceptable to the user, an evaluator is invoked. The evaluator makes recommendations, based upon identified rule conflicts, for modifications that will improve the model's performance. The developer selects changes recommended by the evaluator, and then applies the changes to the model. The evaluator then calculates the performance of the modified model and displays the results. Once the performance and the system criteria are within a range acceptable to the developer, the model is added to a template to create a physical interface. If more than one process diagram has been input, the developer may repeat the process for the next process diagram. MAP can integrate each accepted model with other accepted models and with non-task pages to form a complete user interface for an application. MAP may also be applied to existing designs and applications to determine if changes are warranted.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3B depicts the second portion of the flow chart for the MAP.

FIG. 4 depicts a flow chart of the modeler.

FIG. 7D depicts entry of control types.

FIG. 8A depicts a screen for entry of FTE assumptions

FIG. 8B depicts a representation of typical performance data.

FIG. 8C depicts an example of a customer service model.

FIG. 9A depicts a task model created from the process diagram.

FIG. 9C depicts a task model with estimator output.

FIG. 9E depicts a task model with an updated performance.

DETAILED DESCRIPTION OF THE PREFERRED EMBODIMENT

Figure 1:
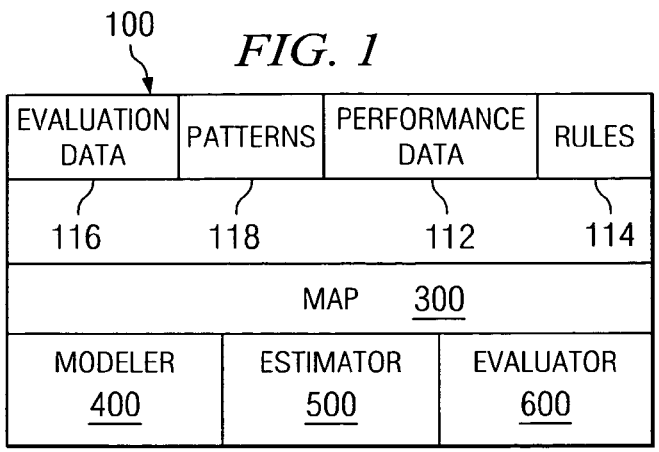
FIG. 1 depicts a representative computer memory in which the invention resides.

A person of ordinary skill in the art will appreciate that the present invention may be implemented in a variety of software and hardware configurations. It is believed, however, that the invention is described best as a computer program that configures and enables one or more general-purpose computers to implement the novel aspects of the invention.

As used herein, "catalog" means a directory of files and libraries with reference to their locations.

As used herein, "criterion" means a measurable value upon which a decision may be based for satisfaction of requirements.

As used herein, "computer" means a machine having a processor, a memory, and an operating system, capable of interaction with a user or other computer, and shall include without limitation desktop computers, notebook computers, tablet computers, personal digital assistants (PDAs), servers, handheld computers, and similar devices.

As used herein, "conflict" means a difference between a task, logic, or control element of a model and a rule.

As used herein, "control" means a graphical representation of a mechanism in a page to cause or enable a user action.

As used herein, "criterion violation" means a measurable value that is not within an acceptable range for satisfaction of requirements.

As used herein, "developer" means a person that designs programming systems and other applications requiring a user interface for a user's work.

As used herein, "data field" means the area of a page in a model or interface where a user enters information.

As used herein, "element" means a component of a page that represents script, instructions, labels, fields and controls in a model that may be evaluated by a comparison to rules.

As used herein, "environment" means the number of users, customers, machines and databases that singly or in combination may interact in order for the application to perform its purpose.

As used herein, "estimator" means a program that computes (1) an estimated time to complete the operations in each page of a model by obtaining a predictive time for each operation from a performance database, and/or (2) a full time equivalent value for completion of all pages in a path of the model.

As used herein, "evaluation data" means data generated by algorithms of a modeling and analysis program, a modeling and analysis program FTE window, a modeler, an estimator and/or an evaluator.

As used herein, "evaluator" means a program that compares the operations in each page of a model to a set of rules, identifies conflicts between operations and the rules, and displays recommendations for modifying the model in order to improve performance or user interaction.

As used herein, "full time equivalent" or "FTE" means a calculation of the dollar cost for a user to complete a path in a model based upon assumptions entered by the developer.

As used herein, "frequency" means the number of times a model is expected to be run in a specified time period such as one work day.

As used herein, "heuristic" means a method of problem solving in which solutions are discovered by evaluation of the progress made toward the final result.

As used herein, "heuristic rules" means rules written to capture the heuristics an expert uses to solve a problem and may include, without limitation, rules based upon human testing, observation, best practice analysis, interviews, captured historical data, and other methods in order to select guidelines to minimize steps required to perform a task.

As used herein, "instruction" means text displayed on a page directing the user to take an action.

As used herein, "join model" means to add a first model to a previously saved second model, to a saved non-task page, and/or to an application.

As used herein, "link pages" means creation of a defined association between one or more pages.

As used herein, "mapping" means establishing correspondences between a given logical structure and a given physical structure in a program or in a database.

As used herein, "model" means a depiction of one or more pages containing a logical grouping of individual tasks from a process diagram.

As used herein, "modeler" means a program that creates a task model from a process diagram.

As used herein, "non-task page" means a page that does not require user interaction.

As used herein, "operation" means an action by a user to interact with an element of a model.

As used herein, "page" means the visual depiction of information, data fields, and controls enabling the completion of one or more tasks to be displayed at the same time on one screen of a display device by a physical interface.

As used herein, "page flow" means the order in which pages and non-task pages may be accessed by a user.

As used herein, "path" means a route between logical task groupings of user tasks in a model, non-user task in the model may be included in a path.

As used herein, "pattern" means a model or physical interface that a developer saved so that it may be retrieved and used as an initial process diagram, and may include any interface that the developer has entered and saved so that the interfaces may be retrieved and used as an initial process diagram.

As used herein, "performance data" means a set of predictive times associated with each of a plurality of discrete mental operations and/or with each of a plurality of discrete physical operations that a user may perform to interact with an application interface.

As used herein, "physical interface" means the interface generated from a model.

As used herein, "process diagram" means a computerized display of the individual tasks required for an application interface entered by a developer or contained in a pattern selected by a developer for editing.

As used herein, "script" means any text to be displayed on a page that is not an instruction to the user.

As used herein, "rule" means a standard, guideline, and/or heuristic known to achieve a desired usability effect for a particular task, logic, or control element of a model in a particular style and environment and includes, without limitation heuristic rules.

As used herein, "screen" means a user display device upon which a page may be displayed.

As used herein, "style" means the type of interface used to obtain information from a user and to present information to the user of a computer application including without limitation a graphical user interface (GUI), a wizard, a personal digital assistant (PDA), and a web page.

As used herein, "task criterion" means a criterion applied to some aspect of a task such as an acceptable time to perform a task.

As used herein, the term "user environment" means a classification of environment based upon system and purpose including without limitation single user, multi-user, and customer service.

As user herein, "user type" means a classification of users according to age, educational level, language and other factors affecting predictive times and heuristics that can be correlated to performance data and rules.

As used herein, "wizard" means a utility within an application that interacts with a user in order to guide the user through completion of each step of a task.

The internal configuration of a computer, including connection and orientation of the processor, memory, and input/output devices, is well known in the art. FIG. 1 represents the internal configuration of a computer having the computer program of the present invention loaded into memory 100. The computer program of the present invention is depicted as Modeling and Analysis Program (MAP) 300, modeler 400, estimator 500, and evaluator 600, each of which may exist separately or be combined into one program. Memory 100 is only illustrative of memory within a computer and is not meant as a limitation.

Memory 100 also contains performance data 112, rules 114, evaluation data 116, and patterns 118. In the preferred embodiment, performance data 112 includes predictive time data, usually expressed in seconds but not limited to such expression, for the time a user will take to perform an operation in interacting with an application user interface. An example of performance time data can be seen in FIG. 8a. The predictive times may be determined from experimentation and/or secondary sources accepted as reliable within the programming community. Moreover, the predictive times may have been modified and/or edited by the developer to apply to a specific environment, and in such a case such predictive times would be identified as applicable to the specific environment for which they were modified and/or edited. Moreover, predictive times may be classified by style, user type and user environment (See FIG. 8B). For example, categories of user type such as general audience, pre-kindergarten, kindergarten to twelfth grade, college graduate, graduate level education, and over sixty five would allow performance and heuristic factors to be entered in performance data 112 by user type as well as operation and element. In addition, style and user environment affect predictive times and so predictive times may be classified by these factors as well, so that a best predictive time may be determined for an operation according to style, user type and user environment, singly or in combination. Rules 114 are based upon historical best practices for interface performance and other methods known to persons skilled in the art. Rules may be further classified by style, user type and user environment in the same manner as performance data 112.

Rules 114 may be accessed by evaluator 600. In the preferred embodiment, rules 114 may be organized into categories corresponding to levels of a user interface such as task rules, logic rules and control rules. Examples of task rules are: (1) the number of screens encountered by a user prior to starting a task should be in the range of 1 to 2 screens; and (2) the number of screens for a task, if a wizard is not used, should be in the range of 2-3 screens. Examples of logic rules are: (1) a task status graphic, if a wizard is used, should be used; (2) a breadcrumb trail for task flows deeper than 2 screens should be used; (3) the number of control groups per screen should be in the range of 2-3; and (4) and the number of controls per control group should be in the range of 10-12. Examples of control rules are: (1) control labels should be drawn from a user glossary; (2) a control label should be within sixth grade reading level; and (3) visual controls for discrete data should be used. The present invention may interface with performance data 112 and rules 114 through memory 100.

In the preferred embodiment, evaluation data 116 contains data generated by the algorithms of MAP 300 (see FIG. 3B and FIG. 8 for FTE window), estimator 500, and evaluator 600. Patterns 118 contains models and/or physical interfaces saved by the developer to use as initial process diagrams and any other application interfaces that the developer may place in patterns 118 for access as initial process diagrams.

In alternative embodiments, MAP 300, modeler 400, estimator 500, and evaluator 600 can be stored in the memory of other computers. Storing MAP 300, modeler 400, estimator 500, and evaluator 600 in the memory of other computers allows the processor workload to be distributed across a plurality of processors instead of a single processor. Further configurations of MAP 300, modeler 400, estimator 500, and evaluator 600 across various multiple memories and processors are known by persons skilled in the art.

Figure 2:
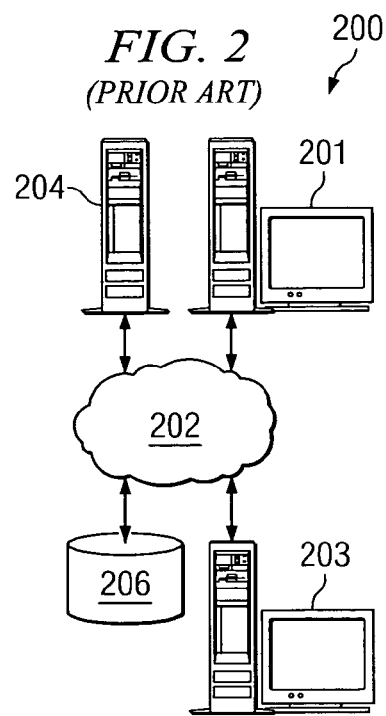
FIG. 2 depicts a computer network in which the invention may be employed.

FIG. 2 illustrates a common prior art architecture for connecting various hardware devices to create a network for transferring data. Computer network 200 comprises local workstation 201 electrically coupled to network connection 202. In FIG. 2, local workstation 201 is coupled electrically to remote workstation 203 via network connection 202. Local workstation 201 also is coupled electrically to server 204 and persistent storage 206 via network connection 202. Network connection 202 may be a simple local area network (LAN) or may be a larger wide area network (WAN), such as the Internet. While computer network 200 depicted in FIG. 2 is intended to represent a possible network architecture, it is not intended to represent an architectural limitation.

MAP 300, modeler 400, estimator 500, and evaluator 600 described herein can be stored within memory 100 of any workstation or server depicted in FIG. 2. Alternatively, MAP 300, modeler 400, estimator 500, and evaluator 600 can be stored in an external storage device such as persistent storage 106, or a removable disk such as a CD-ROM (not pictured). Additionally, MAP 300, modeler 400, estimator 500, and evaluator 600 as described in detail below, may be loaded into the memory of more than one computer of FIG. 2 to enable users on different computers to exchange messages over network connection 202.

Figure 3A:
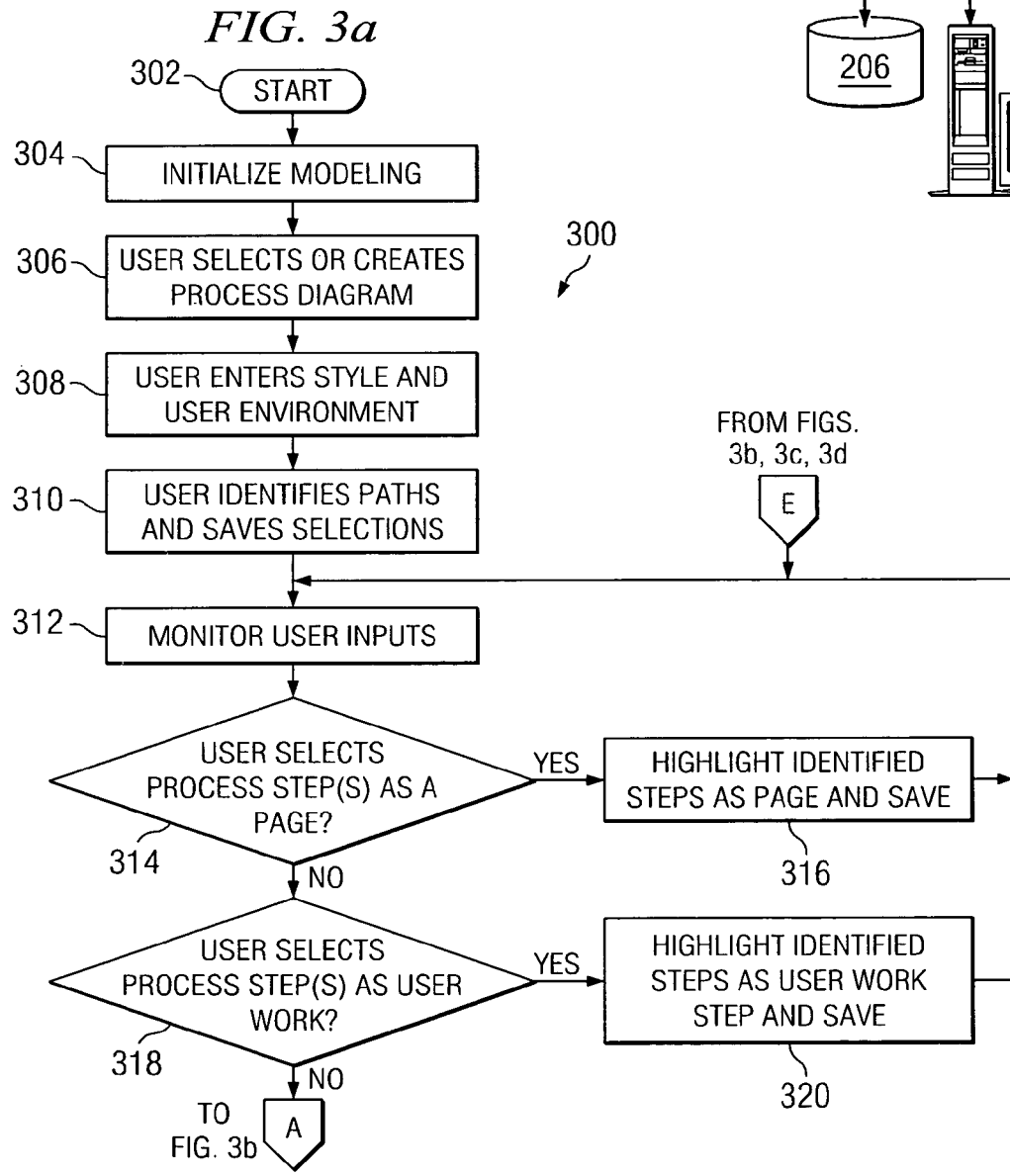
FIG. 3A depicts the first portion of the flow chart for the MAP.

FIG. 3A through 3D depict a flow chart of MAP 300. Referring to FIG. 3A, MAP 300 starts (302) and the developer initializes modeling (304). The user selects a pattern from Patterns 118 (see FIG. 1) or creates a process diagram (306). As will be discussed further in FIG. 7A, the process diagram contains the operations to be performed in order to complete the application task. The user enters the style and the user environment of the interface (308). The user identifies paths and saves selections (310). The program monitors user inputs (312). A determination is made as to whether the user selects a process step or steps as a page (314). If so, MAP 300 highlights the identified step or steps as a page, saves the page (316) and goes to step 312. If not, a determination is made as to whether the user selects a step or steps as work to be performed by the user without the interface (318). If so, the program highlights the identified steps as a "user work" step, saves (320), and goes to step 312.

Referring to FIG. 3B, a determination is made as to whether the user has entered criteria and frequency (322). If so, MAP 300 saves and displays the entered values (324) and goes to step 312. If not, a determination is made as to whether the user has selected the Full Time Equivalent (FTE) link (326). If so, MAP 300 displays the FTE screen, monitors the user input, saves the results (328), and goes to step 312. If not, a determination is made as to whether the user has assigned control types to the data fields (330). If so, MAP 300 displays the indicator for the type of control assigned by the user to the data field, saves (332), and goes to step 312. If not, a determination is made as to whether the user selected the modeler (334). If so, a model of the pages is displayed (336), and MAP 300 goes to step 312.

Figure 3C:
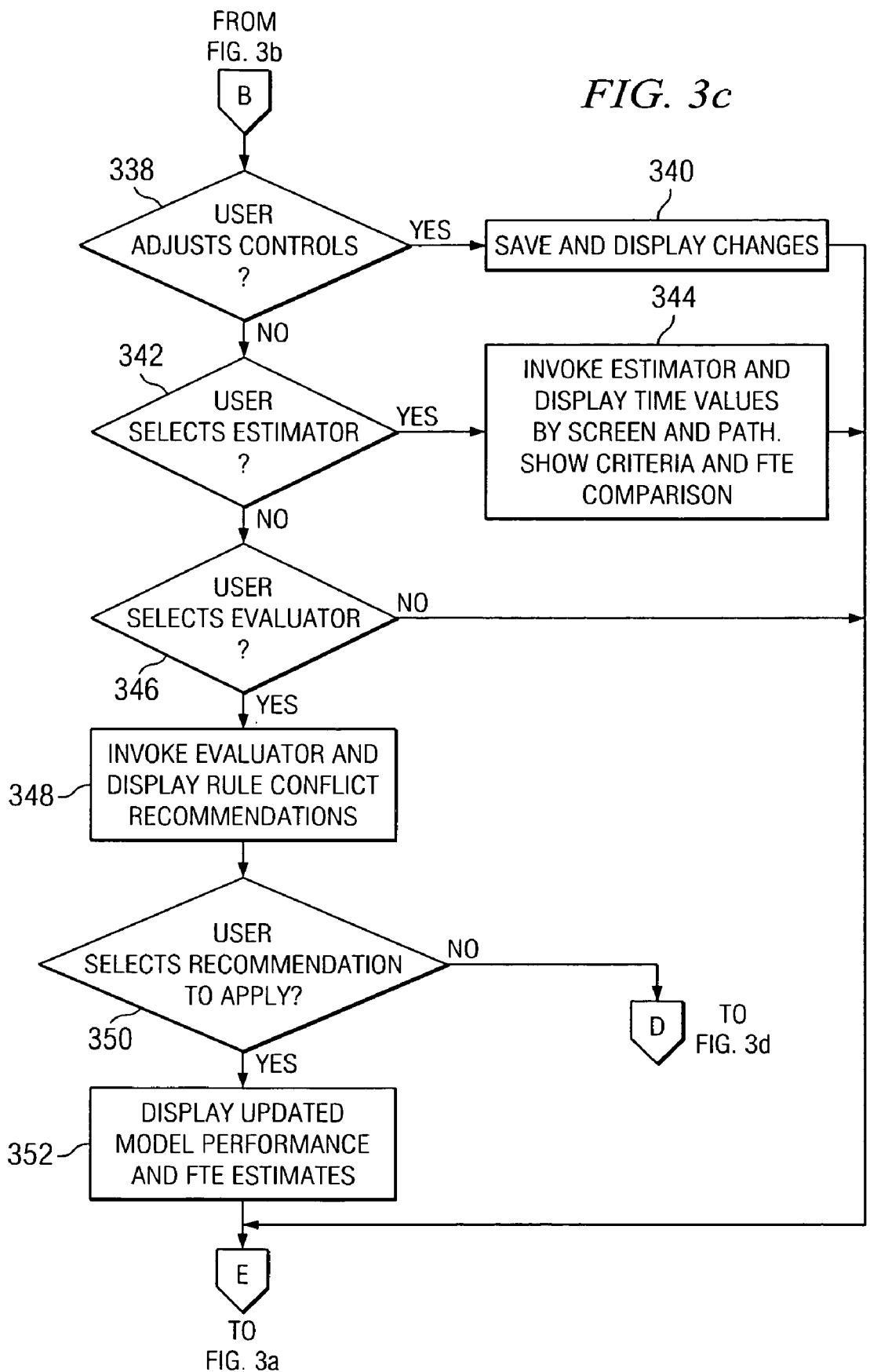
FIG. 3C depicts the third portion of the flow chart for the MAP.

Referring to FIG. 3C, If the user did not select the modeler at step 334, a determination is made as to whether the user has adjusted the controls (338). If so, MAP 300 saves the changes, displays the changes (340) and goes to step 312. If not, a determination is made as to whether the user has selected the estimator (342). If so, estimator 400 (see FIG.

4) is invoked, predictive times are displayed by page and path, and criteria and/or FTE comparisons are shown (344) and MAP 300 goes to step 312. If not, a determination is made as to whether the user selects the evaluator (346). If so, evaluator 500 (see FIG. 5) is invoked, recommendations for rule conflicts are displayed (348) and MAP 300 goes to step 350. If not, MAP 300 goes to step 312. A determination is made as to whether the user has selected recommendations to apply to the model (350). If so, an updated model, updated performance, and updated FTE estimates are displayed (352) and MAP 300 goes to step 312.

Figure 3D:
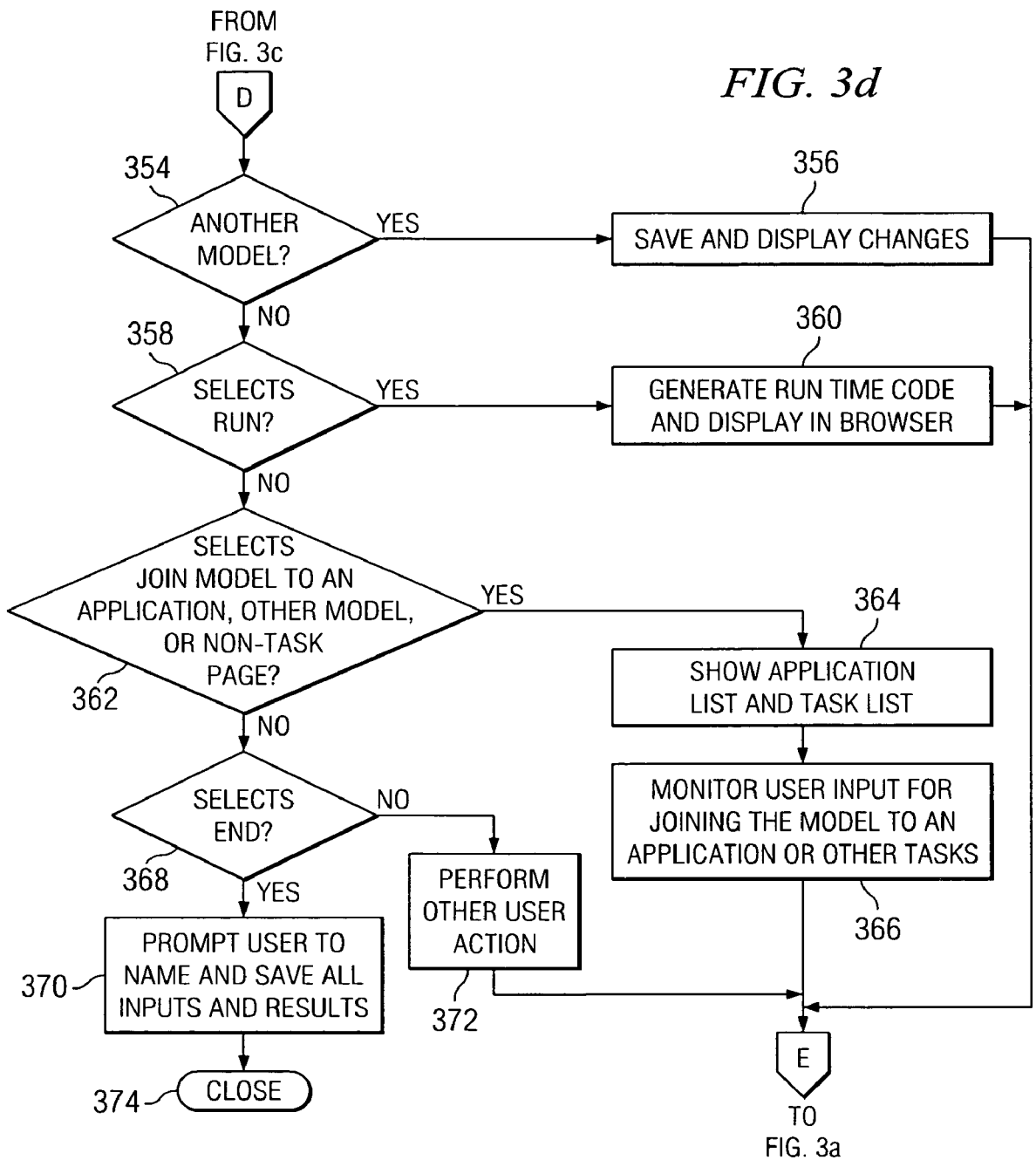
FIG. 3D depicts the final portion of the flow chart for the MAP.

Referring to FIG. 3D, if the user did not select recommendations to apply to the model at step 350, a determination is made as to whether the user wants to create another model for another logical grouping of tasks and paths (354). If so, MAP 300 saves the changes, displays the changes (356) and goes to step 312. If not, a determination is made as to whether the user selected run (358). If so, a run time code is generated and displayed in the browser (360). MAP 300 goes to step 312. If not, a determination is made as to whether the user selected join model to application and/or other tasks (362). If so, MAP 300 shows an application list and task list (364), monitors user input for joining the model to an application or other tasks (366) and goes to step 366. If not, a determination is made as to whether the selections have ended (368). If so, the user is prompted to name and save all inputs and results (370), and MAP 300 closes (374). If not, MAP 300 performs other user actions (372) and goes to step 312.

FIG. 4 depicts a flow chart of modeler 400. Modeler 400 starts (402) when initialized by MAP 300 (See FIG. 3). Modeler 400 gets style, user environment and user properties from MAP 300 (410), and gets pages from MAP 300 (414). A determination is made as to whether there is another page (418). If so, an empty page template, for the style and user environment selected at step 306 of MAP 300 (see FIG. 3A), is generated (422), and the generated page is added to a list of pages and mapped to a path (426). If not, evaluator 400 goes to step 446. A determination is made as to whether another data field is to be entered (430). If so, modeler 400 reads the properties for the data field (434), obtains data field to model mapping from a catalog (438), adds the data field to the model (442) and returns to step 430. If the determination at step 430 is negative, modeler 400 goes to step 418. If the determination at step 418 is negative, modeler 400 generates code to link pages into a model page flow (446), displays the initial page in the model path (450), and modeler 400 ends (454).

Figure 5:
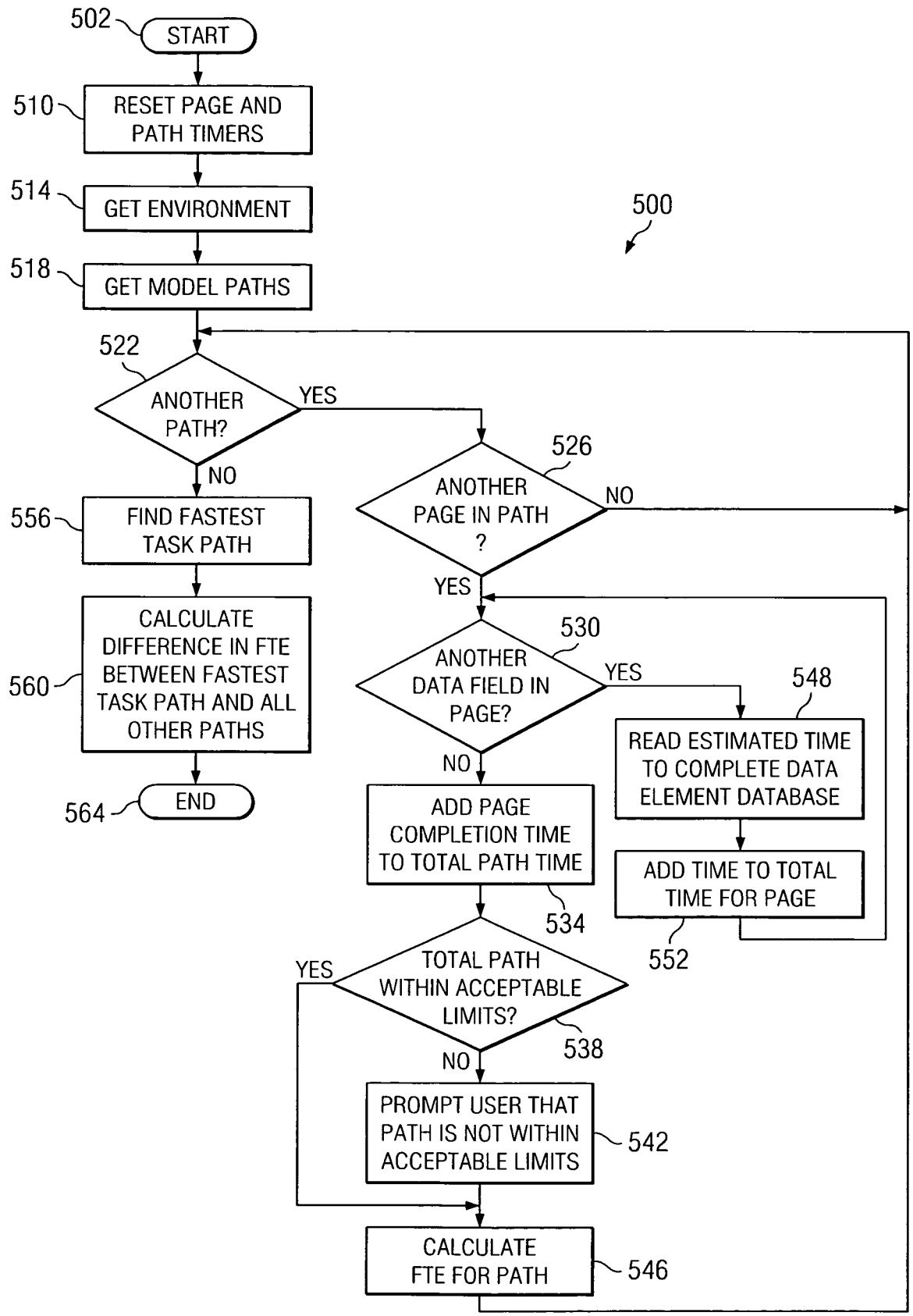
FIG. 5 depicts a flow chart of the estimator.

FIG. 5 depicts a flow chart for estimator 500. Estimator 500 starts (502), resets page and path timers (510), gets the user environment from MAP 300 (514), and gets paths (518). A determination is made as to whether there is another path (522). If so, a determination is made as to whether there is another page in the path (526). If so, a determination is made whether there is another data field in the page (530). If not, estimator 500 returns to step 522. If at step 530, a positive determination is made, estimator 500 reads the predictive time to complete the data element from performance data 112 (See FIG. 1) (548), adds the time to the total time for the page (552) and returns to step 530. If a determination at step 530 is negative, estimator 500 adds the path completion time to the total path time (534) and a determination is made as to whether the total path time is within acceptable limits in relation to the criteria (538). If so, the FTE for the path is calculated (546) and estimator 500 returns to step 522. If not, the user is prompted that the path is not within acceptable limits in relation to the criteria (542). If at step 522, a negative determination is made, estimator 500 finds the fastest path (556), calculates the difference in FTE between the fastest path and all other paths (560) and ends (564).

Figure 6:
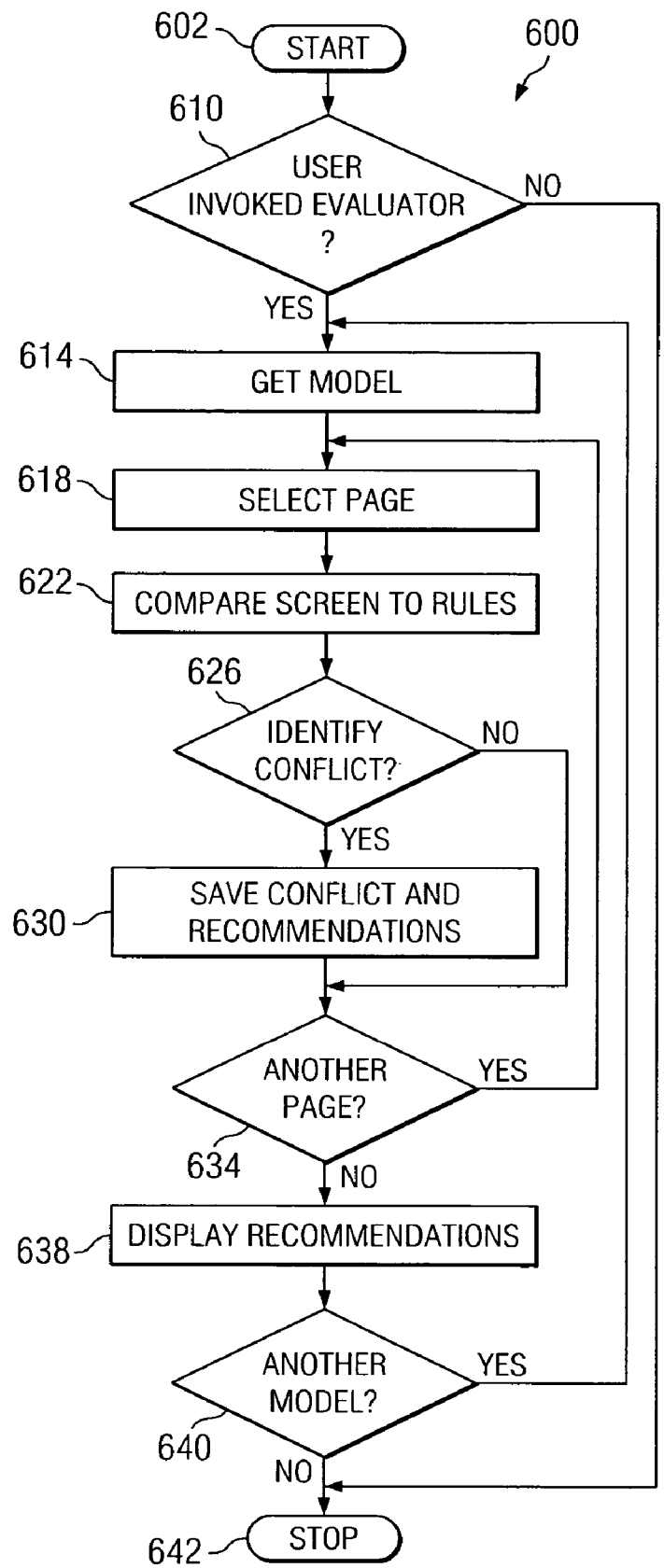
FIG. 6 depicts a flow chart of the evaluator.

FIG. 6 depicts a flow chart for evaluator 600. Evaluator 600 compares the model to Rules 114 (see FIG. 1), and when a conflict is found, presents a recommendation to remove or reduce the conflict and thereby decrease the time necessary to complete the task in the paths of the model. Evaluator 600 starts (602). A determination is made whether the user has invoked the evaluator (610). If not, evaluator 600 stops (642). If so, evaluator 600 gets a model from MAP 300. Evaluator 600 selects a page from the model (618) and compares the elements of the page to rules 114. A determination is made whether there is a conflict. If not, evaluator 600 goes to step 634. If so, a recommendations associated with the conflict is saved (630). A determination is made as to whether there is another page to be processed (634). If so evaluator 600 goes to step 618. If not, evaluator 600 displays the saved recommendations associated with each of the conflicts (638). A determination is made as to whether there is another model to be evaluated (640). If so, evaluator 600 goes to step 614. If not, evaluator 600 stops (642).

Figure 7A:
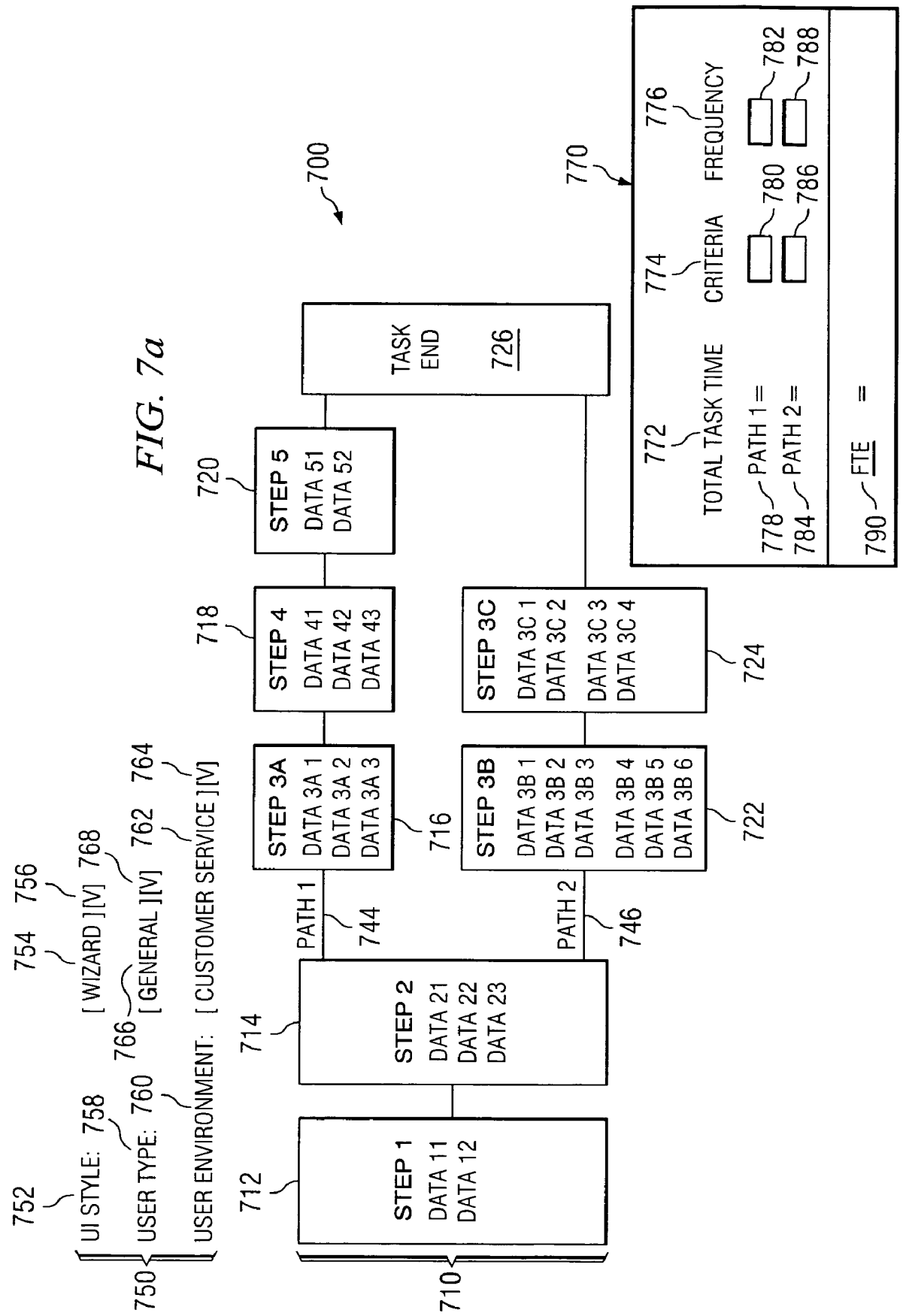
FIG. 7A depicts a process diagram.

FIG. 7A depicts an example of display 700 for MAP 300. Display 700 has three areas. First area 710 displays the process diagram, second area 750 displays identifying data such as style, environment, user type and version, and third area 770 displays evaluation data such as criteria and full time equivalent assumptions. First area 710 is shown having step 1 block 712, step 2 block 714, step 3A block 716, step 3B block 722, step 3C block 724, step 4 block 718, step 5 block 720 and task end block 726. These step blocks are shown by way of example only, and are not intended to represent the only embodiment of third area 770, but rather to provide an example of one possible embodiment. First area 710 will vary depending on each process to be modeled. First area 710 may be selected from a pattern, or the developer may enter a process based upon the developer's knowledge of the application that the interface would support. Each block contains an identifying title and a number of data elements. For example, step 1 block 712 contains an identifying title "step 1" and two data items, data 11 and data 12, necessary to complete step 1 of the overall process.

Second area 750 contains identifying information such as style 752, style version 756, user environment 760, user environment version 764, user type 758 and user type version 768. By way of example, "wizard" is entered in block 754 for the style of the user interface, "general" is entered in block 768, and "customer service" is entered in block 762 for the type of user environment. The user may further identify the version for the wizard in block 764, the version for the user type in block 768, and the version for the customer service model in block 762. Third area 770 displays evaluation data comparing the model to the system criteria. In the preferred embodiment, third area 770 has three columns. First column 772, labeled "total task time," contains the titles of the number of paths necessary to complete the process. Second column 774, labeled "criteria," displays criterion corresponding to the paths. By way of example, first window 780 corresponds to Path 1 and second window 786 corresponds to path 2. Third column 776, labeled "frequency," contains third window 782 corresponding to Path 1 and fourth window 788 corresponding to Path 2. The user enters frequencies for the corresponding paths in third window 782 and fourth window 788.

Figure 7B:
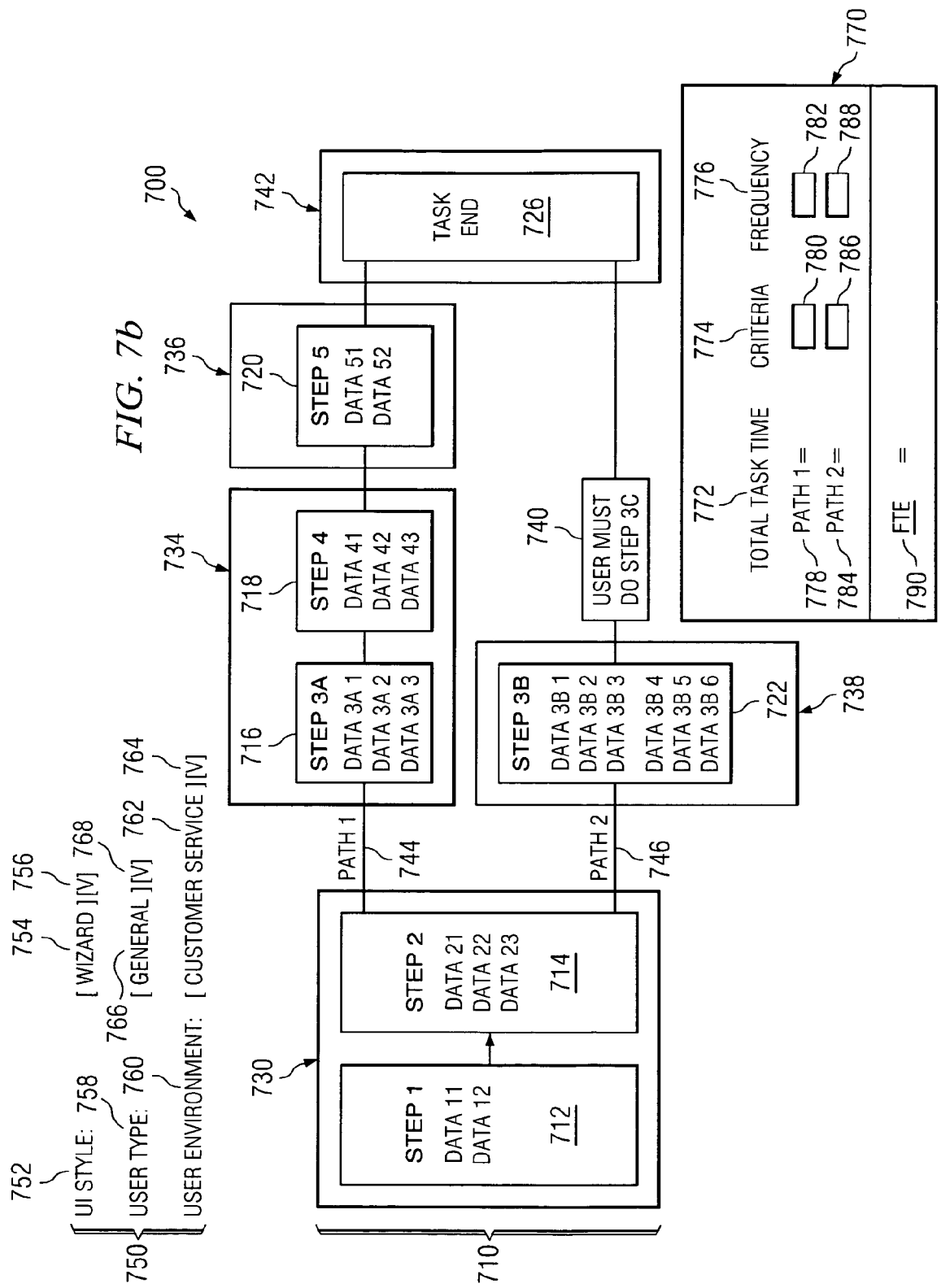
FIG. 7B depicts a process diagram showing logical groupings of user tasks.

FIG. 7B shows user work allocation. The user highlights identified operations and these operations are then contained within a boundary identifying the logical grouping of the operations. For example, Step 1 block 712 and step 2 block 714 are logically grouped into first boundary 730, step 3A block 716 and step 4 block 718 are grouped into second boundary 734. Step 5 block 720 is grouped into third boundary 736. Step 3B block 722 is grouped into fourth boundary 738. Task end block 726 is grouped into fifth boundary 742. The user may also highlight identified steps as user work steps. By way of example, Step 3C block 724 of FIG. 7A has been highlighted and identified as a step to be performed by the user removing it from the logical groupings of steps to be allocated to a page. In other words, Step 3C will be performed away from the computer, and no application support is provided. Performance of step 3C will be part of the system architecture and will not be part of the user interface modeling and analysis of the present invention.

Figure 7C:
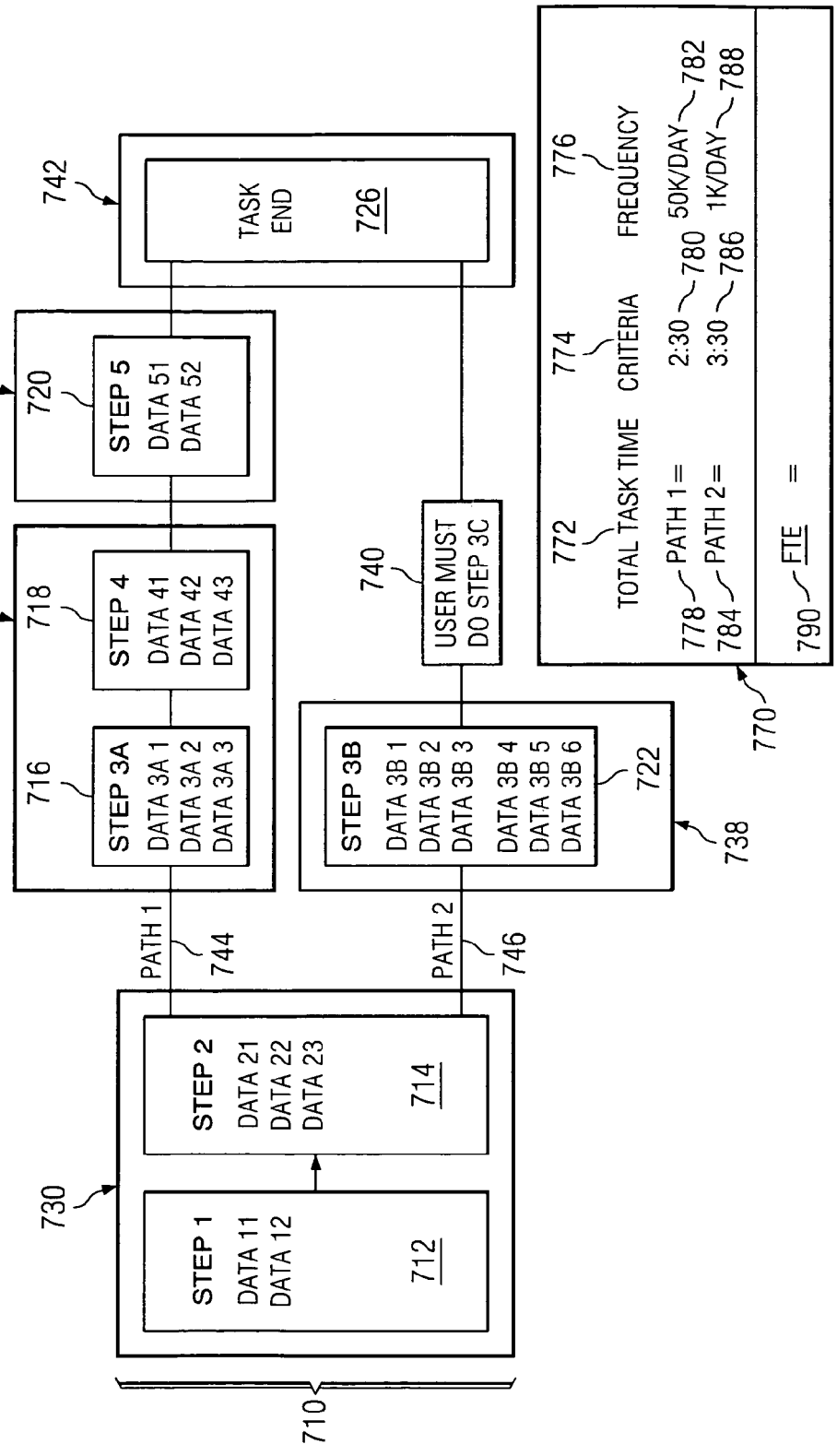
FIG. 7C depicts entry of system criteria.

FIG. 7C shows entry of criteria and frequency data. The user has entered a criterion of 2:30 (two minutes and thirty seconds) for Path 1 into first window 780 of third area 770. The user has also entered a criterion of 3:30 (three minutes and thirty seconds) into second window 786. The criteria define success by setting a maximum time in which the tasks can be performed. The user has entered a frequency of 50 K/day for Path 1 into third window 782, and a frequency of 1 K/day for Path 2 into fourth window 788. The frequency specifies the number of times that task will be performed in a given period, which in the example of FIG. 7C is one work day. FTE assumptions may also be entered, and will be discussed further below.

FIG. 7D shows entry of controls into the model. Symbols for controls are shown next to the data elements in each step. The symbols indicate the type of control to be available for each data element such as dropdowns, entry fields, and lists. For example, in Step 1 block 712, first symbols 713 are entered next to Data 11 and Data 12. In the case of Data 11, the symbol is an inverted triangle depicting a drop down list, and in the case of Data 12 the symbol is an open rectangle depicting an data field. Likewise, Step 2 block has second symbols 715, Step 3A block has third symbols 717, Step 4 block has fourth symbols 719, Step 5 block 721 has fifth symbols 721 and Step 3B block 722 has sixth symbols 723. Task end block 726 and user Step 3C block 740 have no symbols. Symbols may be used as necessary to depict controls to be applied to data fields including without limitation drag drop, menus, dropdowns, entry fields, lists and so forth.

FIG. 8A shows the FTE assumptions window. FTE window 800 has title "FTE assumptions" 810 and script line 812 stating "1 FTE=work hour per week X work weeks per year." First entry line 820 has script stating "work hours per week=" and first FTE window 824. Second entry line 822 has script stating "work weeks per year=" and second FTE field 826. Third entry line 830 has script stating "cost per hour=" and third FTE field 832. FTE assumptions window allows a design decision to be evaluated in terms of user hours saved or lost multiplied by the cost per hour and/or FTEs.

FIG. 8B shows table 850 as an example of data included in performance data 112. Operations in model components column 854 correspond to a predictive time in time column 856. Predictive times may be edited by the developer, or they may be further refined by having performance data 112 that can be accessed by style, user type and/or user environment in qualifying block 852. In other words, the predictive times for a middle aged nurse in a medical environment using a personal digital assistant would be different that those displayed for senior citizen applying for a driver's license renewal using a computer at a government office, and so forth. Although such differences in predictive times for style, user type, and user environment may be very small for most operations, these small differences can add up to significant amounts of time over a long period and thousands or millions of repetitions.

FIG. 8C depicts an example of customer service 880 which depicts a total time for completion of a series of tasks related to a customer service page in a model.

FIG. 9A shows model 900 created by the user. Model 900 is created when the user selects create model in developer 300 (See FIG. 3, step 334) and displays the model (See FIG. 3, step 336). Referring to 9A and to FIG. 7B, Page 1 910 corresponds to first group 730, Page 2 corresponds to second group 734, Page 3 930 corresponds to third group 736, Page 4 960 corresponds to sixth group 742 and Page 5 940 corresponds to fifth group 738. Step 3C 740 remains as this step is not performed by the application and does not require a screen.

Figure 9B:
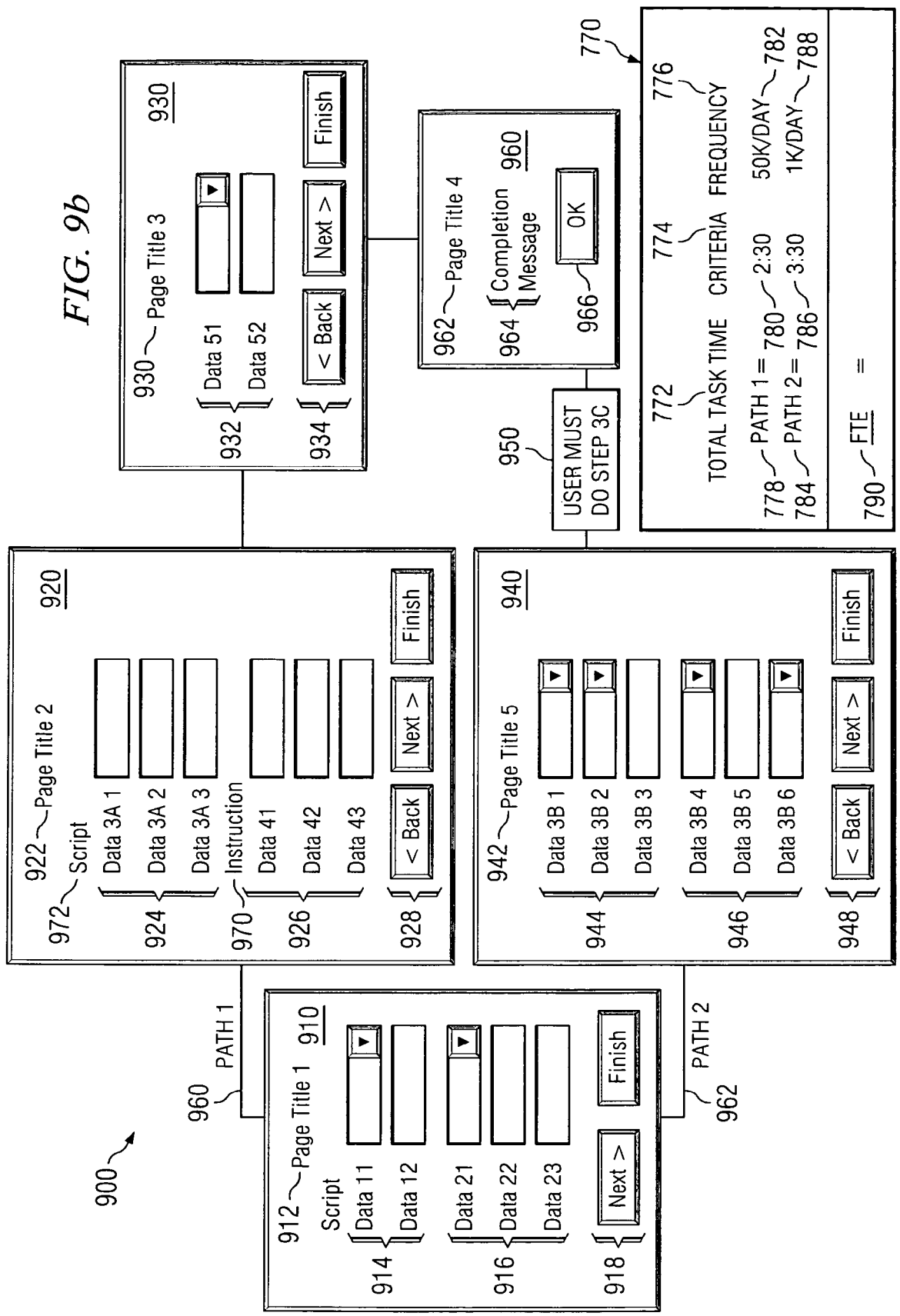
FIG. 9B depicts a task model with additional script and instructions.

FIG. 9B shows the model 900 with the addition of script 972 and instructions 970.

FIG. 9C shows model 900 with path estimates. The user has invoked estimator 500 and estimator 500 has calculated completion times for each page. Evaluator window 770 shows the time for Path 1 as 3:15 (three minutes and fifteen seconds) and for Path 2 as 2:30 (two minutes and thirty seconds). Times for each page in a path, calculated by estimator 500, are shown adjacent to each page. For example, a time of sixty seconds (60 sec 911) is shown by Page 1 910, a time of ninety seconds (90 sec 921) is shown by Page 2 920, a time of fifteen seconds (15 sec 931) is shown by Page 3 930, and a time of thirty seconds (30 sec 961) is shown by Page 4 960. The sum of each of the foregoing times for Path 1 is three minutes and fifteen seconds displayed for Path 1 778 as 3:15 970. A comparison to the system criterion for Path 1 shows that the criterion has been exceeded and the failure of Path 1 to meet the system criteria is shown by underlining and bolding the display for this item. Path 2 shows that the criterion for Path 2 has been met. The FTE for the criterion violation of Path 1 is 6.5, or approximately $990 K/year. The FTE figure allows a developer to make judgment calls on whether the design is within an acceptable range of the criterion based upon an assessment of the business impact. This feature is particularly useful when analyzing existing interface designs, or designs that have been completed with the aid of the invention.

Figure 9D:
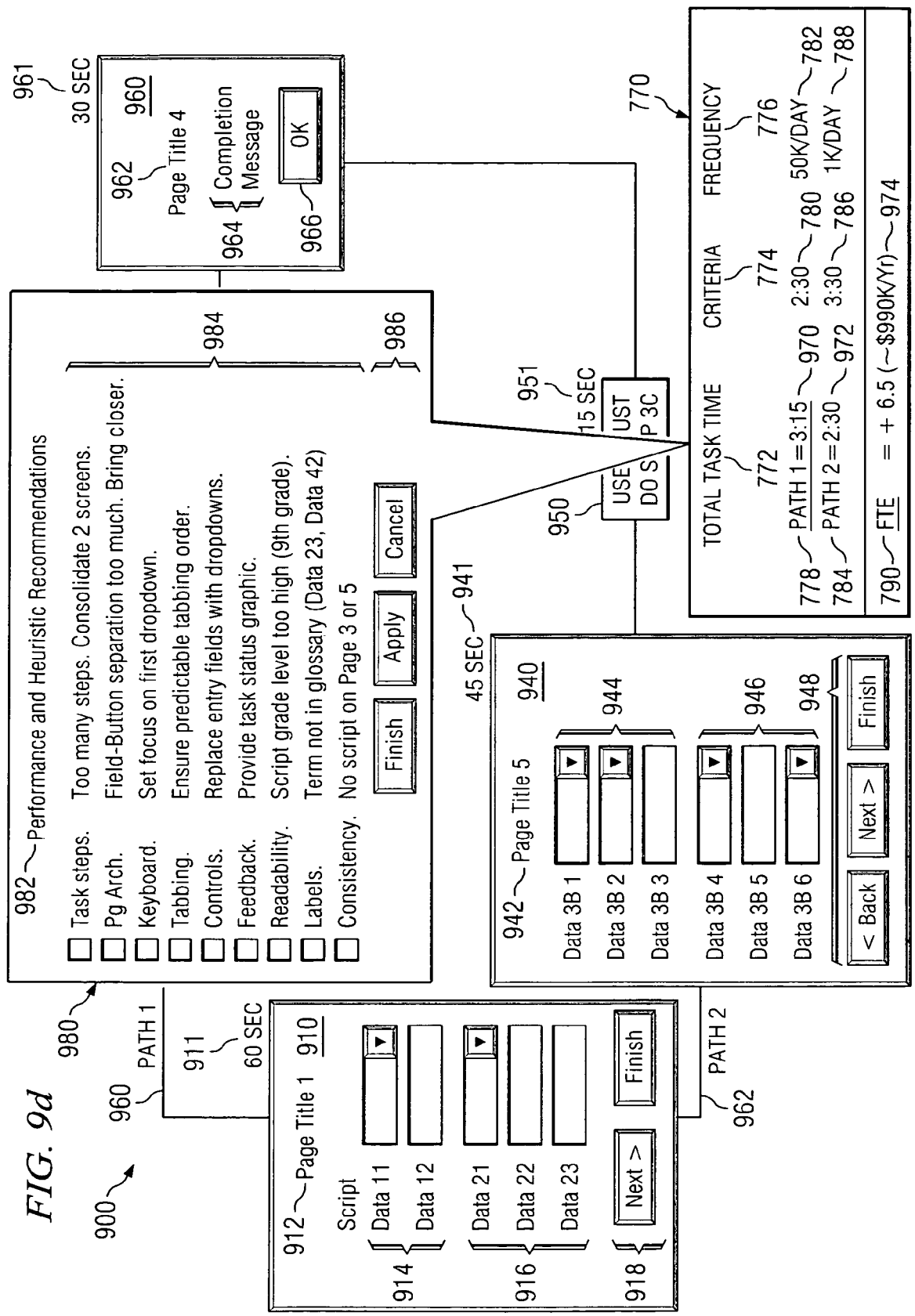
FIG. 9D depicts a task model with evaluator output.

FIG. 9D shows model 900 with evaluator recommendations. The user has invoked evaluator 500. Evaluator 500 makes recommendations on ways to reduce the time in Path 1 and these recommendations are displayed in evaluator window 980.

FIG. 9E shows model 900 with updated path estimates based upon recommendations selected by the developer and incorporated into the model. Evaluator window 770 shows the time for Path 1 as 2:45 (two minutes and forty five seconds) and for Path 2 as 2:30 (two minutes and thirty seconds). Times for each page in a path, calculated by estimator 500, are shown adjacent to each page. The times for by Page 1 910, Page 3 930, and Page 4 960 have not changed. But the time for Page 2 has been reduced to sixty seconds (60 sec 923). The updated time, calculated by summing the times for each page, shows Path 1 778 will take two minutes and forty five seconds (971). A comparison to the system criterion for Path 1 shows that the criterion has again been exceeded but the failure of Path 1 to meet the system criterion has been reduced thirty seconds. The FTE for the criterion violation of Path 1 is 3.5, or approximately $550/Year. The developer may determine whether the design is now within acceptable range of the system criterion for Path 1. Given the business assessment that the criterion violation will result in an annual loss of $550 K, the developer may well decide to continue evaluating and modifying the model.

Figure 10:
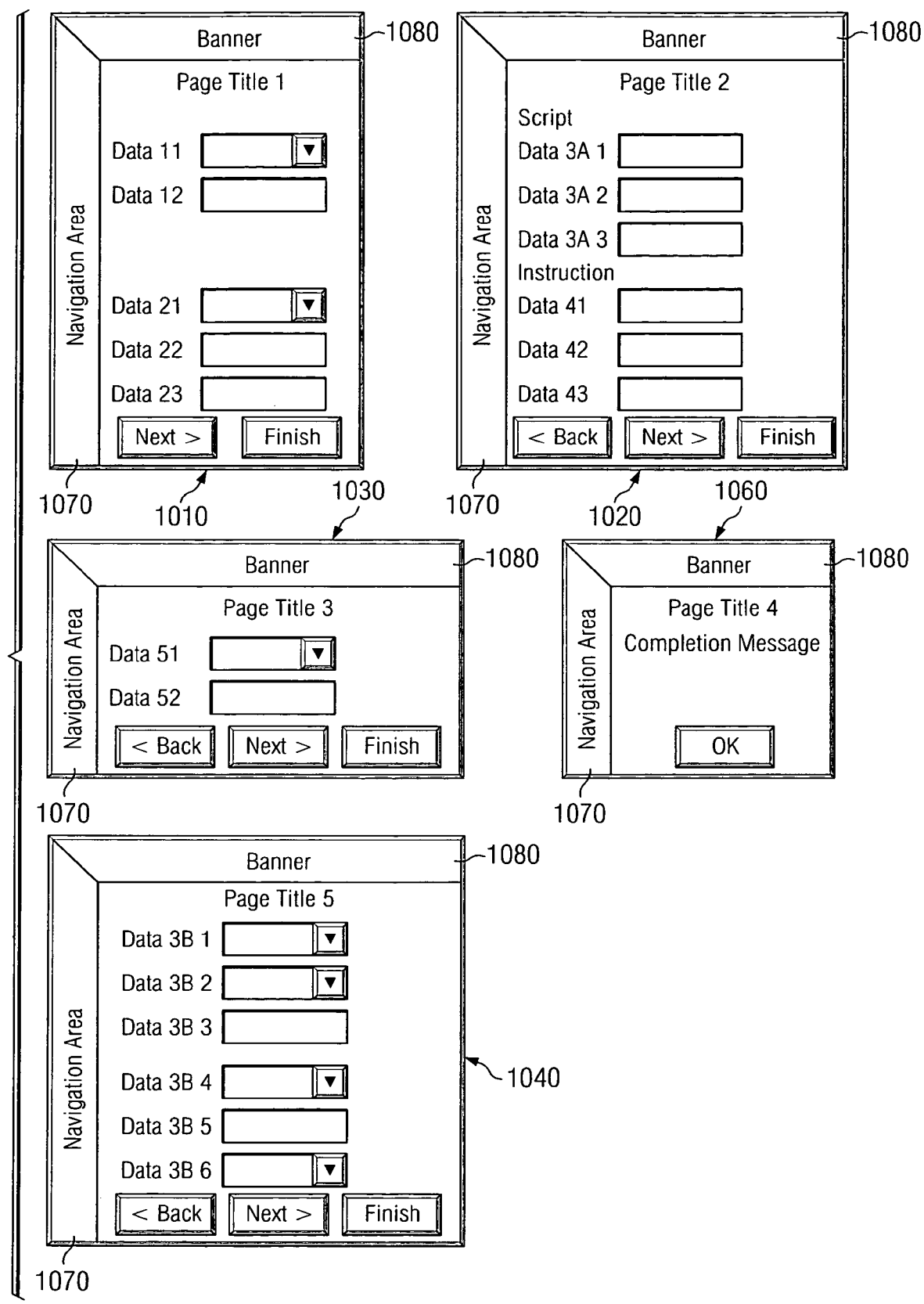
FIG. 10 depicts a physical interface.

FIG. 10 shows model 1000. By way of example, model 1000 is model 900 that has been accepted by the developer, joined to another model, one or more non-task pages, or to an application. Model 1000 has navigation area 1070 added and banner area 1080 added to each page. Navigation area 1070 and banner area 1080 may be default areas automatically added, or they may be edited by the developer.

Figure 11:
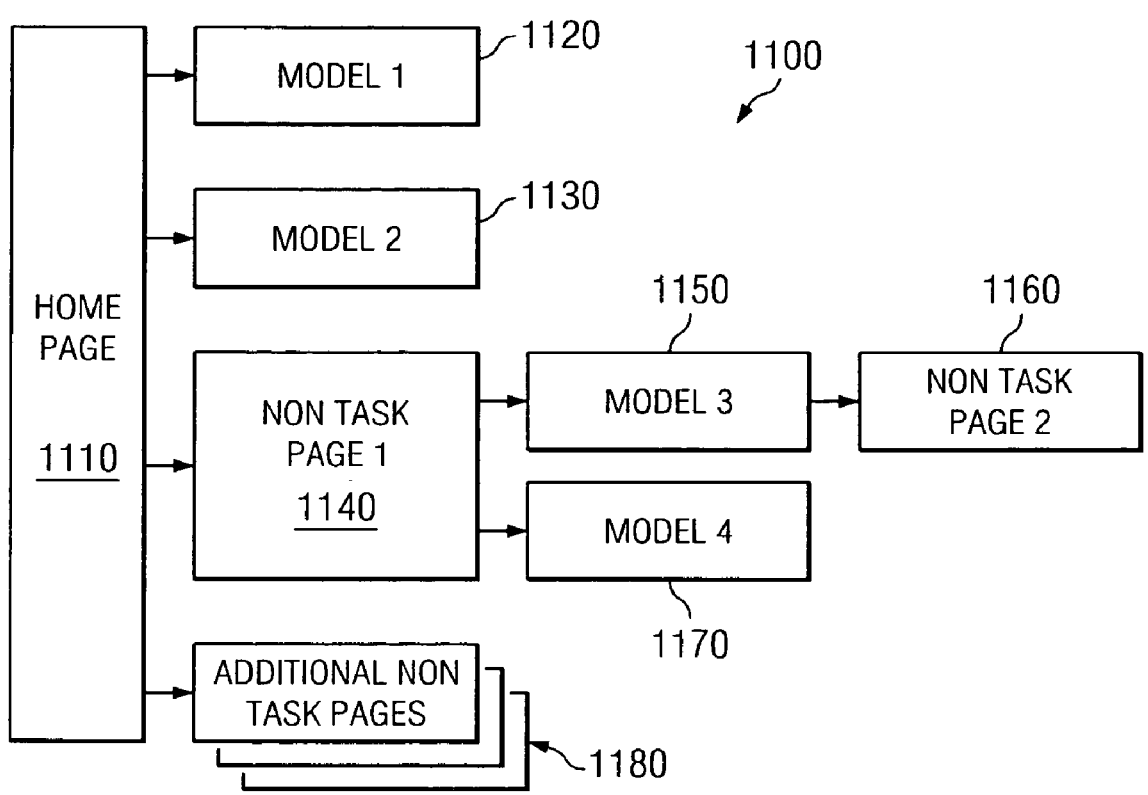
FIG. 11 depicts an application user interface with integrated task pages and non task pages.

FIG. 11 shows application view 1100 as an example of an integrated application view. Application view 1100 has a combination of models and non task pages as well as a home page. The process described above in FIG. 1 through FIG. 10 would produce a single model such as model 1. Additional process diagrams would be modeled and analyzed to produce additional task models, such as Model 2 1130, Model 3 1150 and Model 4 1170. A home page such as Home Page 1110, and non-task pages such as Non Task Page 1 1140, Non Task Page 1160, and Additional Non Task Pages 1180 are integrated by MAP 300 to form a complete application user interface.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer implemented process for application interface design comprising:
   entering a process diagram representing an application user interface design;
   creating a model from the process diagram;
   estimating a performance for a path in the model by a calculating a time to complete a path in a page of the model;
   calculating the time by summing each of a plurality of predictive times corresponding to each of a plurality of operations in the path;
   comparing the performance to a criterion; and
   evaluating an element of the path by comparing the element to a rule, and, responsive to identifying a conflict between the element and the rule, displaying a recommendation to a developer for modifying the model to remove the conflict; and
   responsive to the developer adopting the recommendation, modifying the model in accordance with the recommendation and estimating a new performance for the path;
   wherein the application user interface design may be optimized during the development of the application.

2. The computer implemented process of claim 1 further comprising:
   creating a physical interface.

3. The computer implemented process of claim 1 further comprising:
   integrating a non-task page into the model.

4. The computer implemented process of claim 1 further comprising:
   saving the model as a pattern.

5. The computer implemented process of claim 1 further comprising:
   entering a style comprising the type of interface used to obtain information from a user and to present information to the user of a computer application.

6. The computer implemented process of claim 1 further comprising:
   entering a user environment comprising number of users, customers, machines and databases that singly or in combination may interact in order for the application to perform its purpose.

7. The computer implemented process of claim 1 further comprising:
   entering a full time equivalent assumption.

8. The computer implemented process of claim 1 further comprising:
   calculating a full time equivalent value for the path.

9. The computer implemented process of claim 1 further comprising:
   creating a data base of a plurality of performance data wherein the performance data includes a set of predictive times associated with each of a plurality of discrete mental operations and/or with each of a plurality of discrete physical operations that a user may perform to interact with the application interface.

10. The computer implemented process of claim 9 wherein the database of performance data is classified according to a number of users, customers, machines and databases that singly or in combination may interact in order for an application to perform its purpose.

11. The computer implemented process of claim 9 wherein the database of performance data is based upon a single user environment.

12. The computer implemented process of claim 9 wherein the database of performance data is based upon multi-user environment.

13. The computer implemented process of claim 9 wherein the database of performance data is based upon a customer service environment.

14. The computer implemented process of claim 1 further comprising:
   creating a database of models that the developer saved so that the model may be retrieved and used as an initial process diagram.

15. The computer implemented process of claim 1 further comprising:
   creating a database of physical interfaces that the developer saved so that the physical interface nay be retrieved and used as an initial process diagram.

16. The computer implemented process of claim 1 further comprising:
   linking pages in the model by creating a defined association between one or more pages.

17. The computer implemented process of claim 1 further comprising:
   mapping data fields to the model by establishing correspondences between the area of a page in a model wherein the user enters information and a logical structure of the model.

18. The computer implemented process of claim 1 further comprising:
   creating a database of a plurality of evaluation data generated by algorithms of a modeling and analysis program, a modeling and analysis program FTE window, a modeler, an estimator and/or an evaluator.

19. The computer implemented process of claim 1 wherein evaluating is accomplished by invoking an evaluator that compares the operations in each page of the model to a set of rules, identifies a conflict between an operation and a rule, and displays a recommendation for modifying the model in order to remove the conflict.

20. The computer implemented process of claim 1 wherein estimating is accomplished by invoking an estimator that calculates the time by obtaining a predictive time for each operation from a performance database and summing the times for each page and path.

21. The computer implemented process of claim 1 wherein estimating is accomplished by invoking an estimator that computes a full time equivalent value for completion of all pages in a path of the model.

22. The computer implemented process of claim 1 further comprising:
   assigning a task to a user in a non-task page.

23. A programmable apparatus to perform usability modeling and analysis of an application interface design by a developer comprising:
   a computer;
   a computer readable storage medium connected to the computer;
   a program stored in the storage medium wherein the program comprises instructions to cause the computer to:
      create a model in the program representing an application user interface design;
      calculate a performance for the model by summing each of a plurality of predictive times corresponding to each of a plurality of operations in a path;
      compare the performance to a criterion;
      determine if the performance is acceptable;
      evaluate the model to find a conflict between an element of the model and a rule; and
      provide a recommendation to the developer on how to remove the conflict; and
      responsive to the developer adopting the recommendation, modifying the model in accordance with the recommendation and estimating a new performance for the path;
   wherein the application user interface design may be optimized during the development of the application.

24. The programmable apparatus of claim 23 further comprising instructions to the computer to repeat the process until the performance value is acceptable to the developer.

25. The programmable apparatus of claim 23 further comprising instructions to the computer to create the model from a process diagram.

26. The programmable apparatus of claim 23 further comprising instructions to the computer to select the process diagram from a pattern.

27. The programmable apparatus of claim 23 further comprising:
   means for the developer to enter the process diagram.

28. The programmable apparatus of claim 23 further comprising:
   means for editing the process diagram.

29. The programmable apparatus of claim 23 further comprising:
   means for determining a predictive time for a an operation in a path of a page.

30. The programmable apparatus of claim 23 wherein determining the predictive time for an operation in a path of a page is accomplished by comparing a task in the page to a corresponding task in a performance data table having a predictive time associated with the corresponding task.

31. The programmable apparatus of claim 23 wherein the conflict is found by comparing an element in a page to a rule.

32. The programmable apparatus of claim 23 wherein, responsive to a user determination that a performance is within a range acceptable to the developer, adding the model to an application to create an interface.

33. The programmable apparatus of claim 23 further comprising:
   means for calculating a full time equivalent for the path.

34. A computer software product for user interface usability design comprising:
   a computer readable medium for storing computer program instructions;
   a modeling and analysis computer program stored on the computer readable medium, the computer readable medium so configured by the modeling and analysis program, causes the computer to create a model representing an application user interface design;
   an estimator stored on the computer readable medium, the computer readable medium so configured by the estimator, causes the computer to calculate a performance for the model by summing each of a plurality of predictive times corresponding to each of a plurality of operations in a path;
   an evaluator stored on the computer readable medium, the computer readable medium so configured by the evaluator, causes the computer to compare the plurality of elements to a plurality of rules and responsive to finding a conflict between an element and a rule, to display a recommendation for modifying the element to remove the conflict; and
   a modifier stored on the computer readable medium, the computer readable medium so configured by the modifier, causes the computer, responsive to the developer adopting the recommendation for modifying the model in accordance with the recommendation, to estimate a new performance for the path;
   wherein the application user interface design is optimized during the development of the application.

35. The computer software product of claim 34 wherein the estimator further causes the computer to calculate the performance by summing each of a plurality of predictive times corresponding to each of a plurality of operations in the path.

36. The computer software product of claim 34 wherein responsive to a developer adopting the recommendation, the modeling and analysis program causes the computer to modify the model in accordance with the recommendation and the estimator calculates a new performance for the path.

37. The computer software product of claim 34 wherein the modeling and analysis program causes the computer to create an interface from the model.

38. The computer software product of claim 34 wherein the modeling and analysis program causes the computer to integrate a non-task page and the model into an application view.

39. The computer software product of claim 34 wherein the modeling and analysis program causes the computer to save the model as a pattern.

40. The computer software product of claim 34 further comprising an evaluation data file for receiving a style, a user environment and a full time equivalent assumption for access by the computer.

41. The computer software product of claim 34 wherein the modeling and analysis program causes the computer to calculate a full time equivalent value for the path.

42. A computer implemented process for application interface design comprising:
- entering a process diagram representing an application user interface design;
- entering a style comprising the type of interface used to obtain information from a user and to present information to the user of a computer application;
- entering a user environment comprising number of users, customers, machines and databases that singly or in combination may interact in order for the application to perform its purpose;
- entering a full time equivalent assumption;
- creating a model from the process diagram;
- estimating a performance for a path in the model by a calculating a time to complete a path in a page of the model by summing each of a plurality of predictive times corresponding to each of a plurality of operations in the path;
- comparing the performance to a criterion;
- calculating a full time equivalent value for the path;
- evaluating an element of the path by comparing the element to a rule, and, responsive to identifying a conflict between the element and the rule, displaying a recommendation to a developer for modifying the model to remove the conflict;
- responsive to the developer adopting the recommendation, modifying the model in accordance with the recommendation and estimating a new performance for the path;
- integrating a non-task page into the model; and
- creating a physical interface from the model;
- wherein the application user interface design may be optimized during the development of the application.

* * * * *